US007526842B2

(12) United States Patent
Wemmer

(10) Patent No.: US 7,526,842 B2
(45) Date of Patent: *May 5, 2009

(54) QUICK-MOUNT FLEXIBLE INTERLOCKING ATTACHING SYSTEM

(75) Inventor: Jeffrey M. Wemmer, Odessa, TX (US)

(73) Assignee: Best Made Designs, LLC, Monahans, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/778,034

(22) Filed: Jul. 14, 2007

(65) Prior Publication Data

US 2008/0086846 A1    Apr. 17, 2008

Related U.S. Application Data

(60) Continuation-in-part of application No. 11/485,176, filed on Jul. 11, 2006, now Pat. No. 7,251,867, which is a division of application No. 10/626,897, filed on Jul. 24, 2003, now Pat. No. 7,080,430.

(60) Provisional application No. 60/831,095, filed on Jul. 14, 2006.

(51) Int. Cl.
*A44B 21/00* (2006.01)

(52) U.S. Cl. ............... 24/578.13; 24/3.7; 24/578.17; 24/580.1; 24/DIG. 37

(58) Field of Classification Search ............ 24/3.1, 24/3.5, 3.7, 3.9, 573.09, 578.1, 580.1, 578.13, 24/578.17, 579.09, DIG. 37; 224/675; 2/102, 2/247, 249

See application file for complete search history.

(56) References Cited

U.S. PATENT DOCUMENTS 842,498 A * 1/1907 Schmidt ............... 24/578.1

1,689,399 A * 10/1928 Malone ............... 224/622
3,114,486 A * 12/1963 Flexman ............... 224/628

(Continued)

FOREIGN PATENT DOCUMENTS

CA    642244    6/1962

OTHER PUBLICATIONS

Kirafu; The Dock & Lock System; Apr. 3, 2003; 2 pages; www.kirafu.net.

(Continued)

*Primary Examiner*—James R Brittain
(74) *Attorney, Agent, or Firm*—Howison & Arnott, L.L.P.

(57) ABSTRACT

An interlocking attaching system comprises a substrate adapter, an accessory adapter and a discrete locking member. The substrate adapter includes a base for affixing to a substrate object and a plurality of spaced apart raised regions disposed along a first longitudinal axis. The raised regions have slots defining a first plurality of passages oriented parallel to the first longitudinal axis and aligned with one another. The accessory adapter includes a base for affixing to an accessory object and a plurality of spaced apart raised regions disposed along a second longitudinal axis. The raised regions have slots defining a second plurality of passages oriented parallel to the second longitudinal axis and aligned with one another. The spacing between the locations of the raised regions of the adapters are dimensioned to position at least one raised region of one of the adapters between at least two raised regions of the other adapter when the adapters are in operational alignment, i.e., with their respective top sides together and with their respective passage aligned. The locking member is removably insertable through the passages on both adapters when the adapters are in operational alignment. Insertion of the locking member through the passages of both adapters when the adapters are in operational alignment interlocks the accessory object to the substrate object, and withdrawal of the locking member from the passages releases the accessory object from the substrate object.

20 Claims, 27 Drawing Sheets

U.S. PATENT DOCUMENTS

| | | | | |
|---|---|---|---|---|
| 3,698,045 | A * | 10/1972 | Redden | 24/580.1 |
| 4,231,135 | A * | 11/1980 | Fradin | 16/225 |
| 4,673,070 | A * | 6/1987 | Ambal | 190/108 |
| 4,799,298 | A * | 1/1989 | Matoba | 24/695 |
| 4,934,573 | A * | 6/1990 | Jaeger | 224/628 |
| 5,205,448 | A * | 4/1993 | Kester et al. | 224/575 |
| 5,259,093 | A * | 11/1993 | D'Annunzio | 24/3.9 |
| 5,465,425 | A * | 11/1995 | Crispin | 2/102 |
| 5,604,958 | A * | 2/1997 | Anscher | 24/3.1 |
| 5,632,071 | A * | 5/1997 | Maunder | 24/580.1 |
| 5,724,707 | A * | 3/1998 | Kirk et al. | 24/3.7 |
| 5,815,843 | A * | 10/1998 | Brillhart et al. | 2/247 |
| 6,108,816 | A * | 8/2000 | Bradley | 2/102 |
| 7,080,430 | B2 * | 7/2006 | Wemmer | 24/578.13 |
| 7,251,867 | B2 * | 8/2007 | Wemmer | 24/578.13 |

OTHER PUBLICATIONS

Tactical Tailor; Malice Clips (description and installation instructions); Apr. 3, 2003; www.tacticaltailor.com.

* cited by examiner

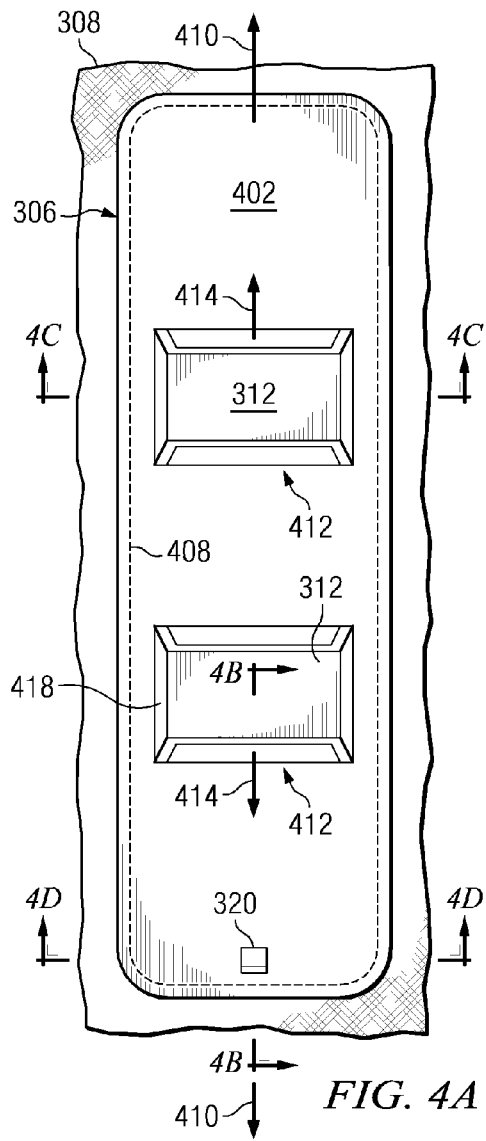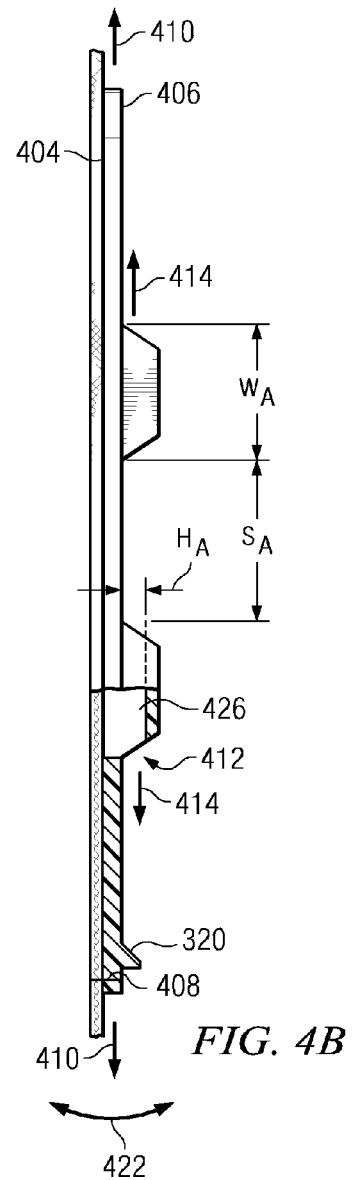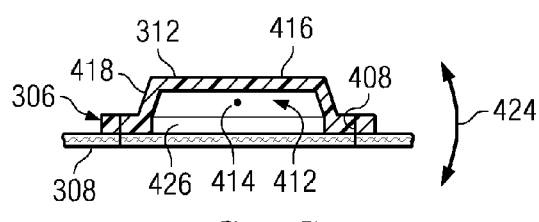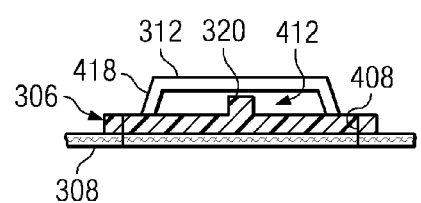
FIG. 4A
FIG. 4B
FIG. 4C
FIG. 4D

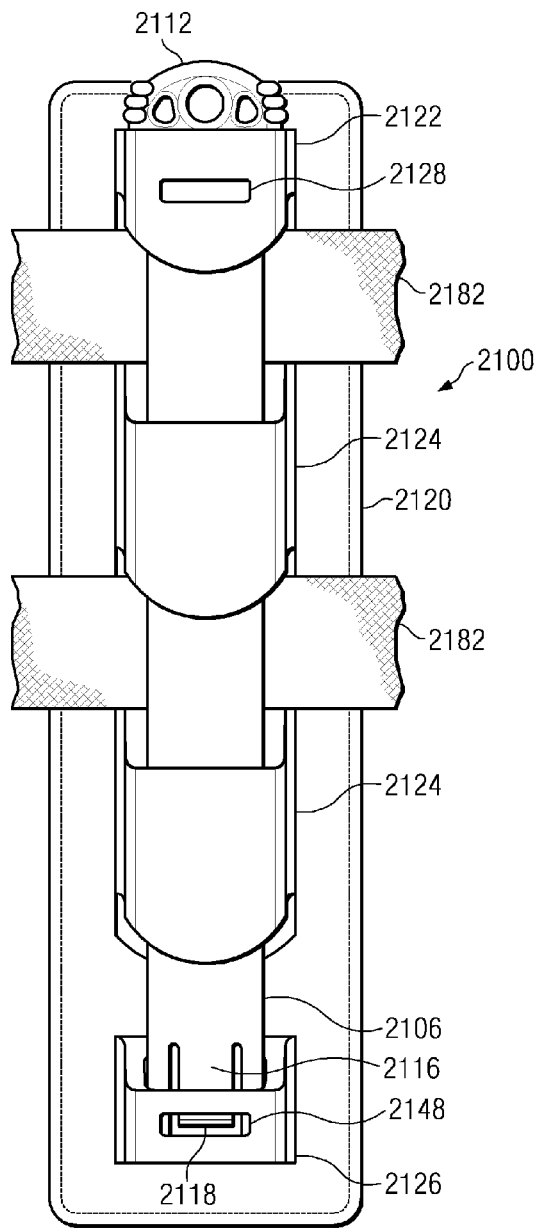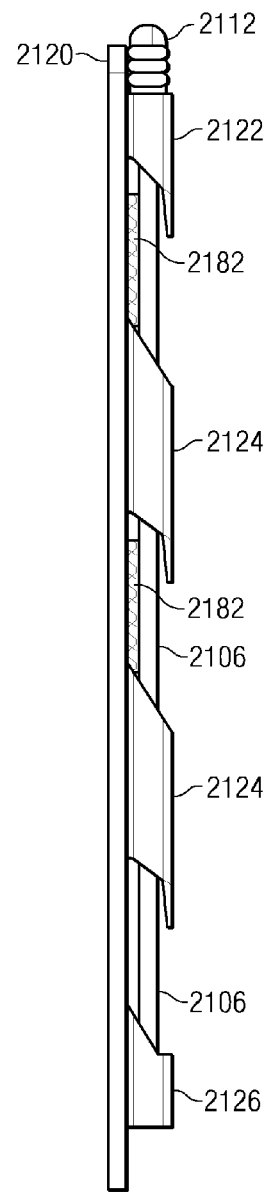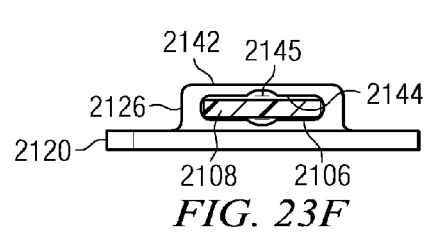
FIG. 23D
FIG. 23E
FIG. 23F

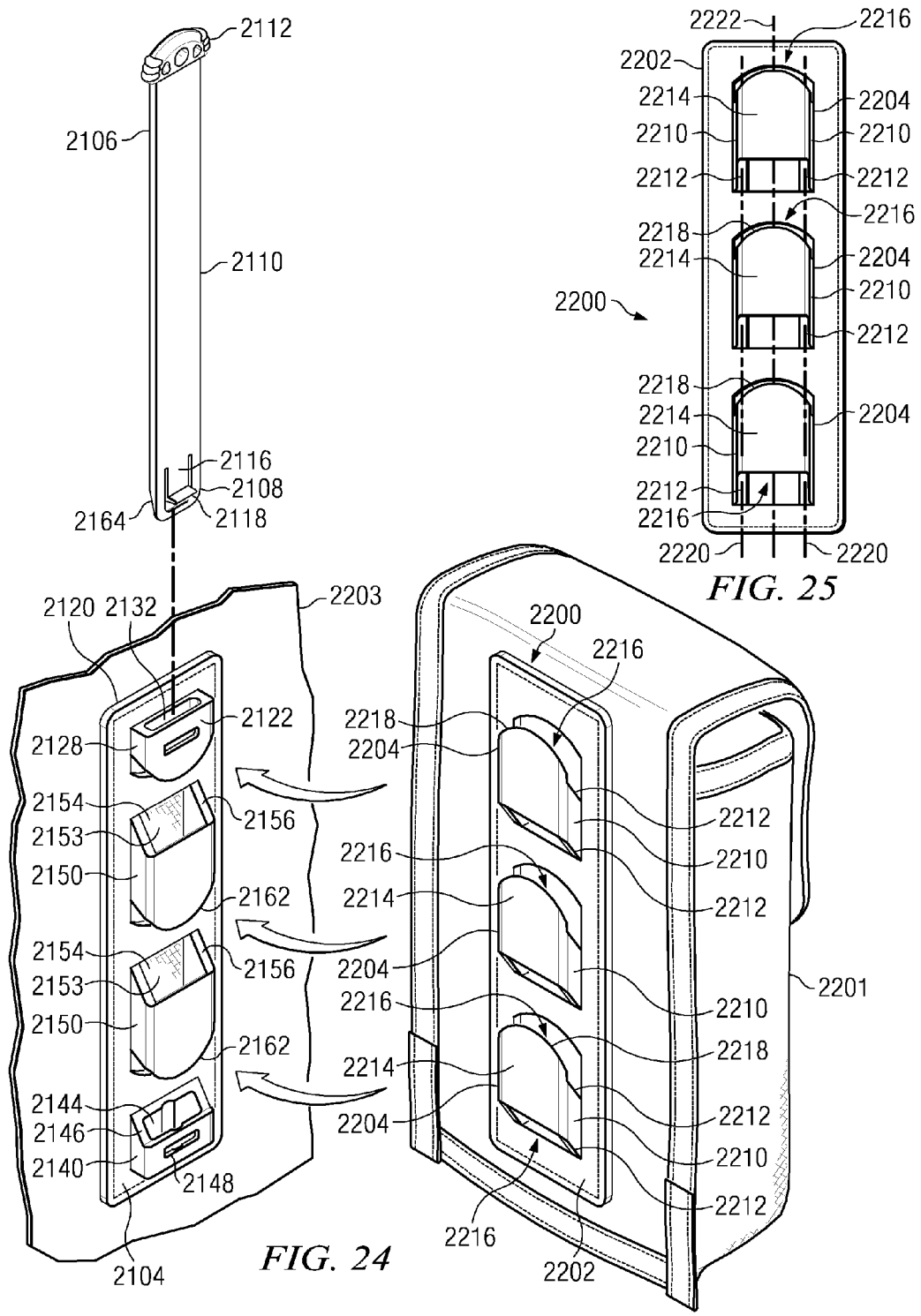

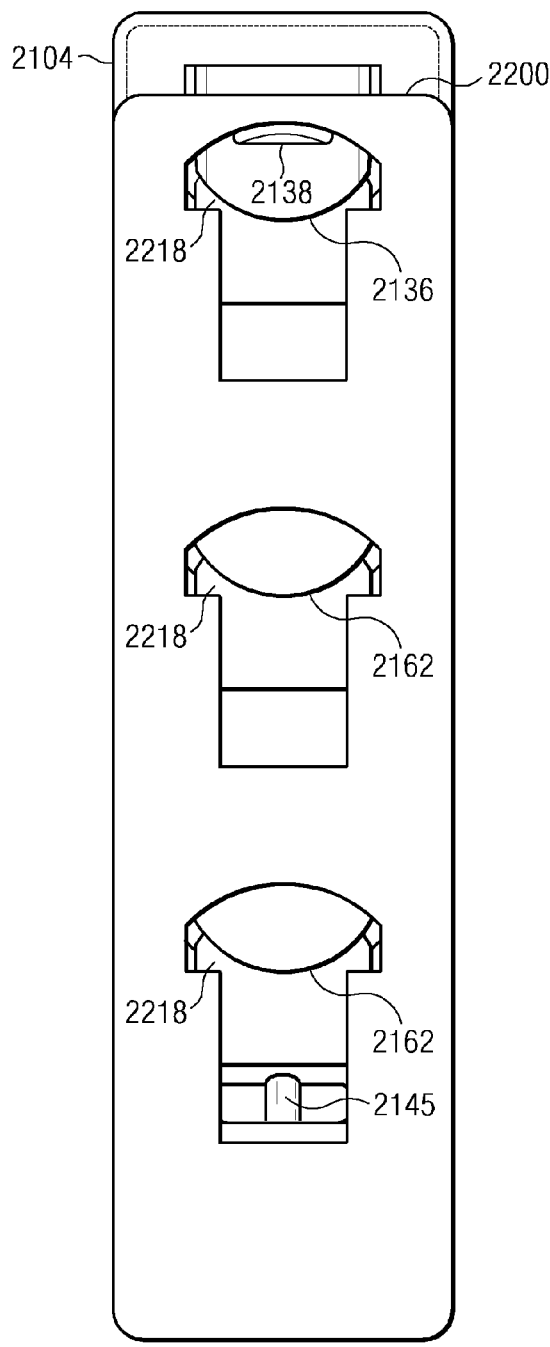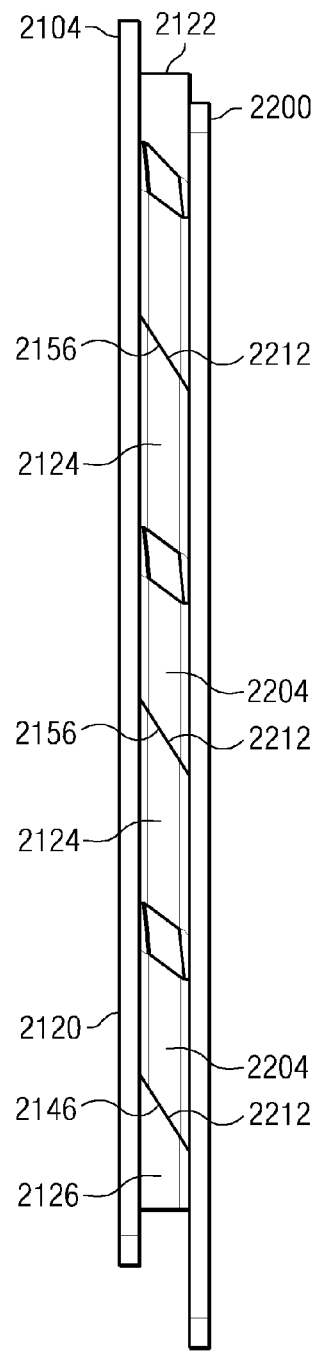
*FIG. 26A*     *FIG. 26B*

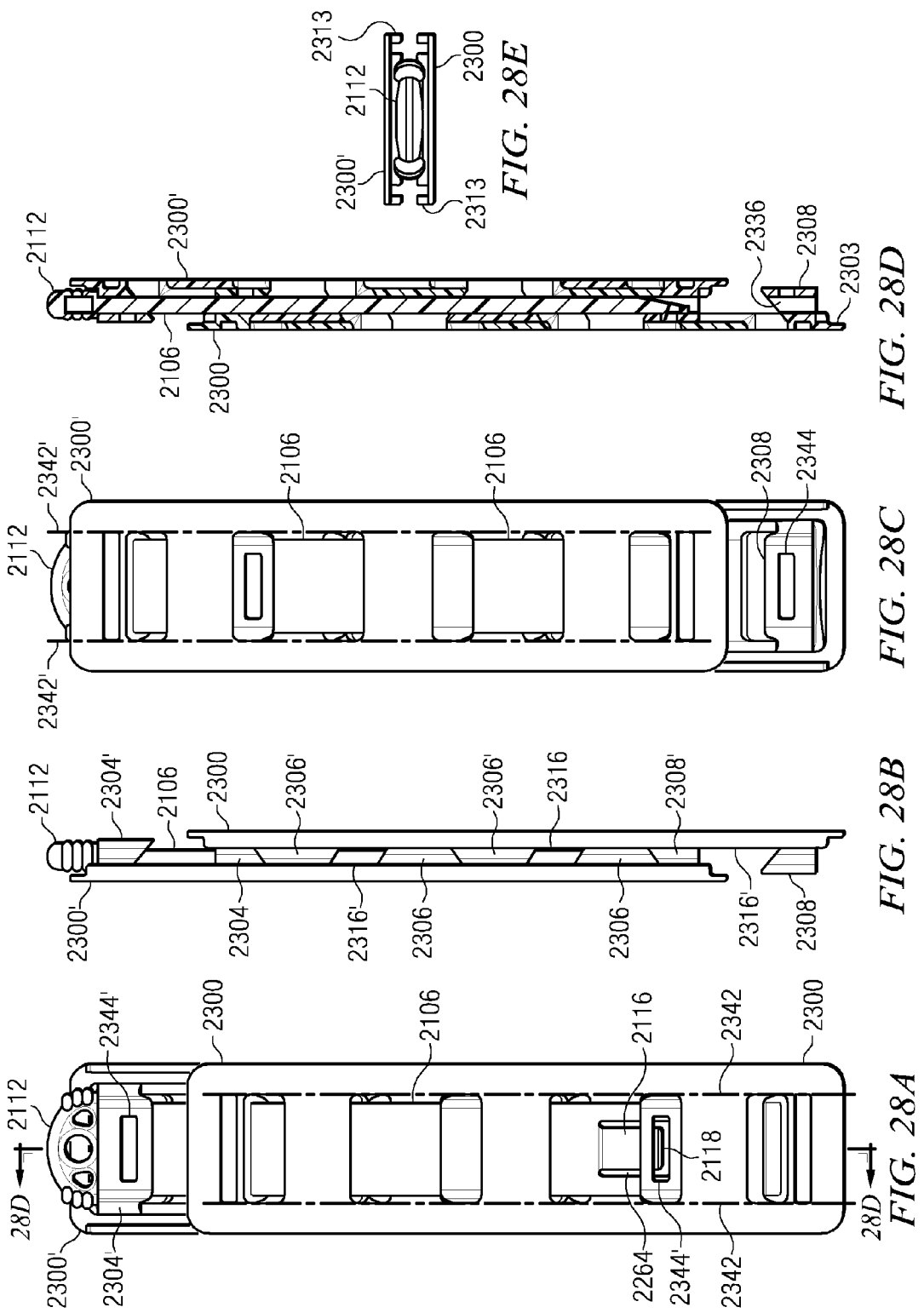

QUICK-MOUNT FLEXIBLE INTERLOCKING ATTACHING SYSTEM

CROSS REFERENCE TO RELATED APPLICATION

This application is a continuation-in-part of U.S. application Ser. No. 11/485,176, filed Jul. 11, 2006 and entitled QUICK-MOUNT FLEXIBLE INTERLOCKING ATTACHING SYSTEM, now issued U.S. Pat. No. 7,251,867, issued Aug. 7, 2007, which is a divisional of U.S. application Ser. No. 10/626,897, filed Jul. 24, 2003, and entitled QUICK-MOUNT FLEXIBLE INTERLOCKING ATTACHING SYSTEM, now issued U.S. Pat. No. 7,080,430, issued Jul. 25, 2006. This application further claims the benefit of U.S. Provisional Application for Patent Ser. No. 60/831,095, filed Jul. 14, 2006 and entitled QUICK-MOUNT FLEXIBLE INTERLOCKING ATTACHING SYSTEM.

TECHNICAL FIELD

This disclosure relates generally to fasteners, connectors and attaching systems, and more particularly, to an interlocking attaching system for removably securing pockets, pouches or other modular accessories to a garment, backpack or other substrate.

BACKGROUND

It is known to use interlocking attaching systems to removably secure pockets, pouches and the like to garments such as vests or backpacks. Some prior art systems, such as that disclosed in U.S. Pat. No. 5,724,707, utilize a plurality of spaced-apart webbings sewn in parallel strips across the mounting surface of both objects. The stitching that holds the webbing in place is perpendicular to the webbing and spaced apart to create channels there between. A flexible strap is affixed to one of the objects. The free end of the strap is passed in sequence first through the webbing channels on the first object, then back through the webbing channels on the second object, and so forth to interlock the two objects. Similar prior art systems are widely used (e.g., by the military), however, such systems have a number of significant drawbacks. These include the requirement for careful placement and alignment of webbing strips on each object, requirements for holding the webbing in position during stitching, and requirements for a large number of separate stitching operations on each webbing to form the channels. Each tack stitch represents a potential failure or defect site in the product, thus, there are a high number of potential failure sites associated with prior art webbing-type systems. There is typically a high instance of post-manufacturing rejection (e.g., during quality control inspection) due to human error in the placement and alignment of webbing strips. Rejected product typically cannot be salvaged and is thus worthless. Each of these drawbacks tends to increase the manufacturing costs for articles utilizing this attaching system.

Additionally, when exposed to water (including rain or user perspiration) or used in wet or humid environments, the prior art webbing-type attachment systems can gain significant weight from water absorption. Even when made of a polymer material such as nylon, the woven webbing is porous and inherently absorbent due to the great surface area of the woven material and the water-holding voids between the fibers. Once saturated with water, webbing-type systems can remain wet for long periods, especially in cold or humid conditions. The increased weight of wet webbing-type attachment systems increases the load on the soldier/user wearing the system, and will typically result in reduced mobility performance and/or reduced amounts of equipment and/or supplies (e.g., ammunition) that can be carried. Further still, where weight-sensitive transportation is employed (e.g., transportation of users/soldiers by airplane or helicopter), the cumulative weight increase of multiple water-saturated webbing-type attachment systems worn by the passengers will reduce the payload and/or performance of the aircraft.

Alternative attaching systems that avoid the use of webbing strips have been proposed. For example, the systems disclosed in U.S. Pat. Nos. 5,815,843 and 4,673,070 each include a pair (one "male" and one "female") of one-piece members having interfitting rails or channels that can be affixed to the objects to be joined (one member on each object). Objects equipped with male adapters can be slidingly engaged to other objects equipped with a female adapter. Such attaching systems eliminate many of the drawbacks associated with the positioning, holding and stitching operations of webbing-type systems, however, such systems are not compatible with existing equipment fitted with webbing-based systems. This means that adoption of these attaching systems would make large quantities of existing equipment fitted with webbing-based attaching systems obsolete.

A need therefore exists for an attaching system that overcomes these shortcomings of the prior art.

SUMMARY

In one aspect, an interlocking attaching system for removably securing an accessory object to a substrate object includes a one-piece molded substrate adapter, a one piece molded accessory adapter and a discrete locking member. The substrate adapter includes a generally flat base having a bottom side for affixing to the substrate object and a top side having a plurality of raised regions formed thereon at spaced apart locations disposed along a first main axis. The raised regions have slots formed therein defining a first plurality of passages oriented parallel to the first main axis and aligned with one another along a first passage axis. The accessory adapter includes a generally flat base having a bottom side for affixing to the accessory object and a top side having a plurality of raised regions formed thereon at spaced-apart locations disposed along a second main axis. The raised regions have slots formed therein defining a second plurality of passages oriented parallel to the second main axis and aligned with one another along a second passage axis. The spacing between the locations of the raised regions of the adapters is dimensioned to position at least one of the raised regions of one of the adapters between at least two of the raised regions of the other adapter when the adapters are placed in operational alignment with their respective top sides together and with the first and second passage axes aligned with one another. The locking member has a leading end and a trailing end and is removably insertable leading-end-first through the passages on the raised regions of both of the adapters when the adapters are in operational alignment. Insertion of the locking member through the passages on the raised regions of both of the adapters when the adapters are in operational alignment interlocks the accessory object to the substrate object, and withdrawal of the locking member from the passages releases the accessory object from the substrate object.

In another aspect, an interlocking attaching system for removably securing an accessory object to a substrate object comprises a substrate adapter, an accessory adapter and a discrete locking member. The substrate adapter includes a base having a bottom side for affixing to the substrate object and a top side having at least one loop column formed thereon. Each loop column includes a plurality of loops disposed at spaced apart locations along a column axis and oriented so as to define a common passage therethrough. The accessory adapter includes a base having a bottom side for affixing to the accessory object and a top side having at least one loop column formed thereon. The locking member is removably insertable through the common passages of both of the adapters. The spacing between the loops of the adapters is dimensioned to position at least one of the loops of each loop column of one of the adapters between at least two of the loops of each corresponding loop column of the other adapter when the adapters are placed in operational alignment with their respective top sides together and with the common passages of the corresponding loop columns aligned. Insertion of the locking member into the common passages of the respective adapters when the adapters are in operational alignment interlocks the accessory object to the substrate object, and withdrawal of the locking member from the common passages releases the accessory object from the substrate object.

In another aspect, a substrate adapter for removably securing an accessory object to a substrate object is a one-piece article comprising a base having a bottom side for affixing to the substrate object and a top side having at least two loop columns formed thereon. Each loop column includes a plurality of loops disposed at spaced apart locations along a column axis and oriented so as to define a common passage therethrough. All of the column axes are parallel to one another.

In accordance with the disclosure, an accessory adapter for removably securing an accessory object to a substrate object in conjunction with at least one locking member having a first component of a latching mechanism is a one-piece article comprising a base having a bottom side for affixing to the accessory object and a top side having at least one loop column formed thereon. Each loop column includes a plurality of loops disposed at spaced apart locations along a column axis and oriented so as to define a common passage therethrough and all of the column axes are parallel to one another. The accessory adapter of this aspect further comprises at least one second component of the latching mechanism, where each second component of the latching mechanism is disposed on the base in association with a particular loop column for releasably securing one locking member in a predetermined position of engagement with the accessory adapter when the locking member is inserted into the common passage of the respective loop column.

In accordance with one variation, an adapter for removably securing one of an accessory object or substrate object to another of an accessory object or substrate object is disclosed, the one of the substrate object or accessory object having a plurality of loops disposed at spaced apart locations along a column axis on a top side thereof, the loops forming at least one loop column, includes an elongated locking member having a main body, a leading end, a trailing end and a first latching feature and an adapter body formed from a solid (i.e., not woven) plastic material including a base affixable to one of the accessory object or substrate object. A first end guide extends from the base proximate a first end of the adapter body, the first guide defining a slot therethrough for receiving the locking member and a second end guide extends from the base proximate a second end of the adapter body, the second guide defining a slot therethrough. At least one of the first and second end guides includes a second latching feature for engaging the first latching feature of the locking member. At least one intermediate guide extends from the base spaced apart from and disposed between the first and second end guides and defines a slot therethrough, the slots of the end and intermediate guides defining a common passageway through the guides for receiving the locking member. The leading end of the locking member is received through a first one of the end guides, a first one of the loops of the loop column, at least one intermediate guide, at least one second one of the loops of the loop column and the second one of the end guides to secure the adapter to one of the accessory object and substrate object with the first latching feature engaging one second latching feature to secure the locking member in the passageway.

In one aspect, the substrate comprises a wearable garment wherein the adapter is affixed to one of the wearable garment and accessory object by sewing the base to the one of the wearable garment and accessory object. In another aspect, the second end guide has a top wall and a bottom wall wherein at least one of the top and bottom walls includes a groove formed on an inside surface thereof that facilitates disengagement of the first and second latching features. In one variation, the first latching feature comprises a wedge-shaped projection and the second latching feature comprises an aperture for receiving the projection. The locking member may further comprise an enlarged trailing end such that the trailing end cannot enter the slots defined by the first and second end guides.

In another variation, an adapter for removably securing one of an accessory object or substrate object to another of an accessory object or substrate object, one of the substrate object or accessory object having a plurality of loops disposed at spaced apart locations along a column axis on a top side thereof, the loops forming at least one loop column, includes an elongate locking member having a main body, a leading end, a trailing end and a first latching feature and an adapter body formed from a solid material including a base affixable to one of the accessory object or substrate object. A first, substantially rigid end guide extends from the base proximate a first end of the adapter body, the first guide defining a slot having a width substantially greater than height and including a second latching feature for engaging the first latching feature of the locking member. A second, substantially rigid end guide extends from the base proximate a second end of the adapter body, the second guide defining a slot having a width substantially greater than height and including a second latching feature for engaging the first latching feature of the locking member. At least one, substantially rigid intermediate guide extends from the base and spaced apart from and disposed between the first and second end guides, each intermediate guide defining a slot having a width substantially greater than height, the slots of the end and intermediate guides defining a common axis therethrough and defining a passageway through the guides for receiving the locking member. The main body of the locking member is received through at least one of the loops of the loop column and at least two of the slots to secure the adapter to one of the substrate object or accessory object with the first latching feature engaging one second latching feature to secure the locking member in the passageway. In this variation, the locking member is configured with a width substantially greater than height such that the adapter is non-rotatable around the locking member when the locking member is received in the slots. In one variation, the substrate comprises a wearable garment and wherein the adapter is affixed to one of the wearable garment and accessory object by sewing the base to the one of the wearable garment and accessory object.

In one aspect, the adapter is formed from a solid (i.e., not woven) plastic material wherein the second end guide has a top wall and a bottom wall and wherein at least one of the top and bottom walls includes a groove formed on an inside surface thereof that facilitates disengagement of the first and second latching features. In another, the locking member is formed from a solid plastic material and further comprises an enlarged trailing end such that the trailing end cannot enter the slots defined by the first and second end guides. The locking member may further comprise a beveled leading end having rounded corners to aid in inserting the locking member through the slots.

In yet another variation, an adapter for removably securing an accessory object to a wearable garment includes an adapter body formed from a solid plastic material including a base affixable to the accessory object. A first substantially rigid end guide extends from the base proximate a first end of the adapter body, the first guide including a top wall and opposed side walls defining a slot parallel to a longitudinal axis of the adapter body. A second, substantially rigid end guide extends from the base proximate a second end of the adapter body, the second end guide including a top wall and opposed sidewalls defining a slot parallel to a longitudinal axis of the adapter body. At least one of the first and second end guides includes a second latching feature for engaging the first latching feature of an elongate locking member. At least one intermediate guide extends from the base, the intermediate guide including a top wall and opposed sidewalls defining a slot parallel to a longitudinal axis of the adapter body, wherein the intermediate guide is spaced apart from and disposed between the first and second end guides for receiving the loops of the loop column between the intermediate and end guides, the slots having a common axis therethrough and defining a passageway through the guides for receiving the locking member. The locking member is inserted through at least one of the loops of the loop column and at least two of the slots to secure the accessory object to the wearable garment with the first latching feature engaging one second latching feature to secure the locking member in the passageway.

BRIEF DESCRIPTION OF THE DRAWINGS

FIGS. 4A-4D illustrate additional details of the accessory adapter for the attaching system of FIG. 3. In particular:

FIG. 4A is a top view;

FIG. 4B is a side view with a partial cross section taken along line 4B-4B of FIG. 4A;

FIG. 4C is a cross-sectional end view taken along line 4C-4C of FIG. 4A;

FIG. 4D is a cross-sectional end view taken along line 4D-4D of FIG. 4A;

FIG. 5A is a top view;

FIG. 5B is a side view with a partial cross section taken along line 5B-5B of FIG. 5A;

FIG. 5C is a cross-sectional end view taken along line 5C-5C of FIG. 5A;

FIG. 5D is a cross-sectional end view taken along line 5D-5D of FIG. 5A;

FIG. 6A is a top view;

FIG. 6B is a side view;

FIG. 12A is a side view;

FIG. 12B is a rear view;

FIG. 12C is a bottom view;

FIG. 15A is a top view;

FIG. 15B is a side view;

FIG. 15C is a side cross-sectional view taken along line 15C-15C of FIG. 15A;

FIG. 15D is an end view;

FIG. 15E is an end cross-sectional view taken along line 15E-15E of FIG. 15A;

FIG. 15F is an end cross-sectional view taken along line 15F-15F of FIG. 15A;

FIG. 16A is a top view;

FIG. 16B is a side view;

FIG. 16C is a side cross-sectional view taken along line 16C-16C of FIG. 16A;

FIG. 16D is an end view;

FIG. 16E is an end cross-sectional view taken along line 16E-16E of FIG. 16A;

FIG. 16F is an end cross-sectional view taken along line 16F-16F of FIG. 16A;

FIGS. 23D and 23E are top and side views, respectively, of the adapter and locking member of FIG. 21A engaged with web straps of a substrate, garment or accessory;

FIG. 23F is an end view of the adapter and locking member of FIG. 23A;

FIG. 24 is a perspective view of a substrate garment fitted with the adapter of FIG. 21A and a modular accessory fitted with a corresponding mating adapter;

FIG. 25 is a top view of the mating adapter of FIG. 24;

FIG. 26A is a bottom view of the mating adapter of FIG. 25 engaged with the adapter of FIG. 21A;

FIG. 26B is a side view of the mating adapter of FIG. 25 engaged with the adapter of FIG. 21A;

FIGS. 28A, 28B and 28C are top, side and bottom views, respectively of adapters according to FIG. 27A engaged with each other with a locking member;

FIG. 28D is a sectional view of the adapters of FIG. 28A; and

FIG. 28E is an end view of the adapters of FIG. 28A.

DETAILED DESCRIPTION

Figure 1:
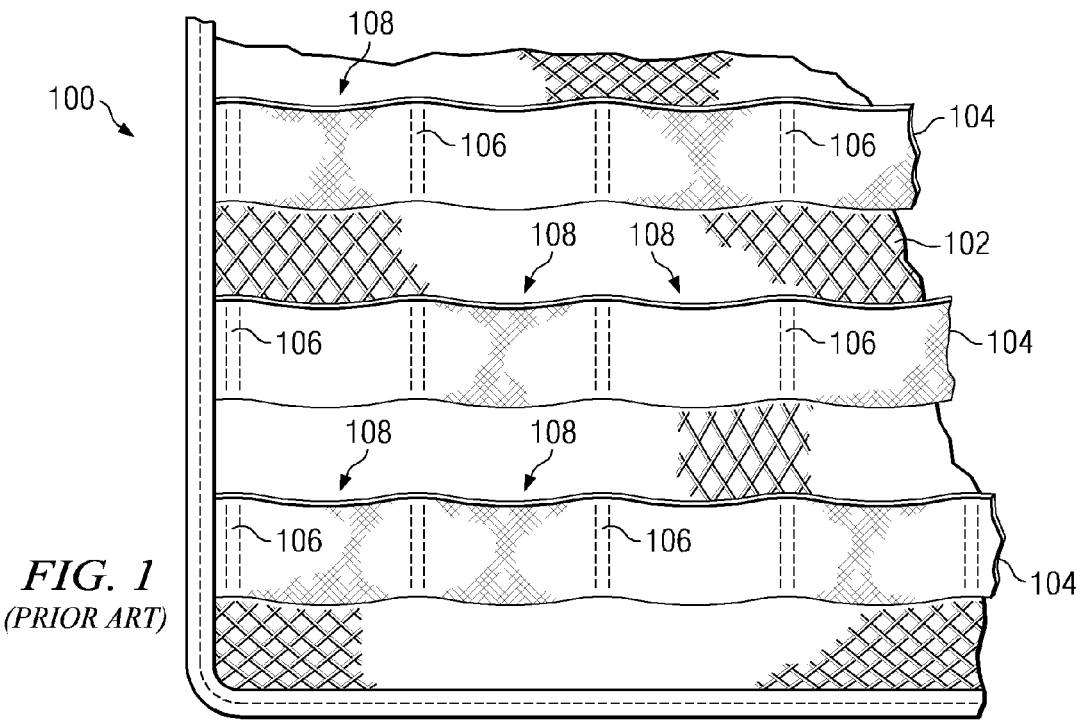
FIG. 1 shows a portion of a vest fitted with one component of a PRIOR ART webbing-type interlocking system.

Referring now to the drawings, wherein like reference numbers are used herein to designate like elements throughout, the various views and embodiments of a quick-mount flexible interlocking attaching system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2:
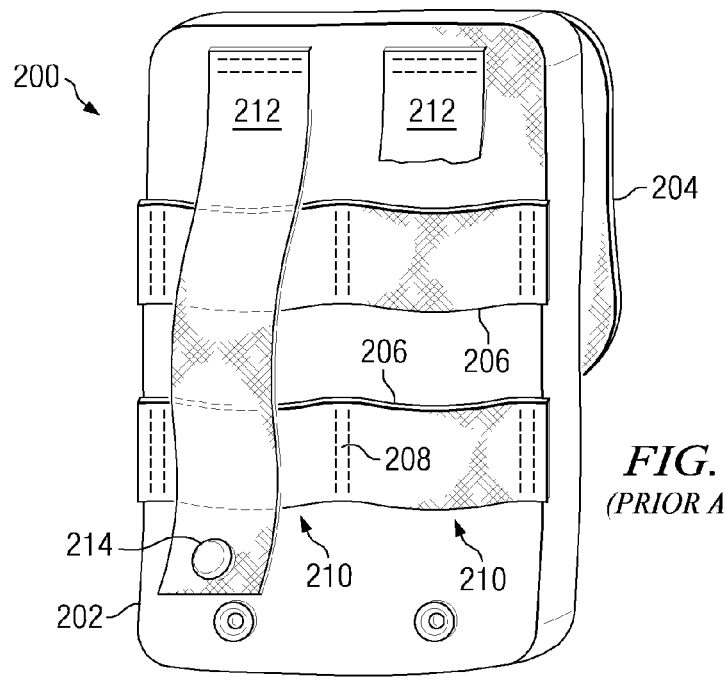
FIG. 2 shows a modular pocket fitted with cooperating components of the PRIOR ART interlocking system.

Referring now to FIGS. 1 and 2, there is illustrated a prior art interlocking system of the webbing type for attaching accessory objects to a substrate garment. FIG. 1 illustrates a portion of a load bearing vest 100, which in this case is the substrate object adapted to use the prior art attachment system. The vest 100 includes a mesh body 102 that allows air to circulate to the wearer. The vest 100 is adapted to use the prior art attachment system by the addition of narrow strips of webbing 104 attached in parallel bands across its surface. The webbing 104 is attached to the vest body 102 with a series of tack stitches 106 which run perpendicular to the webbing and are spaced apart along the webbing to create channels (indicated by arrows 108) there between. The stitching 106 on each of the webbing strips 104 must be aligned with the stitching on the other strips such that the channels 108 are continuous in the vertical direction across the strips. These channels 108 will receive an attaching strap from the accessory object as explained below.

FIG. 2 shows a rear view of a modular pocket 200 that is adapted for use with the prior art webbing type attachment system. The prior art pocket 200 includes a body 202 with an openable flap 204 on the front. Attached to the back of the pocket 200 are strips of webbing 206 which have been stitched to the rear side of the pocket using perpendicular tack stitches 208 to form vertical channels (indicated by arrows 210) similar to those described on the webbing 104 of the vest 100. The webbing strips 206 on the pocket 200 are spaced apart such that they will fit between the webbing strips 104 on the vest 100 when the two objects are brought together. The prior art pocket 200 further comprises one or more attaching strips 212 attached to the top of the pocket. It will be appreciated that a portion of the right strap 212 in FIG. 2 has been omitted for purposes of illustration. When the modular pocket 200 is placed against the vest 100 with the webbing strips 104 and 106 interleaved and the vertical channels 108 and 210 aligned, the attaching straps 212 may be sequentially interwoven through first the channel on the vest, then the channel on the pocket, then the channel on the vest again, etc. in order to interlock the pocket to the vest. A snap 214 or other latching device is provided at the end of the strap 212 in order to prevent it from disengaging from the interlocked condition.

While the prior art webbing type interlocking attachment system described above has been widely adopted, especially by the military, garments and accessory objects adapted to utilize this system can be relatively expensive to produce. This is due to the high manufacturing costs resulting primarily from the numerous discrete manufacturing operations required to produce the prior art attachment system. For example, each webbing strip 104 and 206 must be individually positioned on the object and held in position as each of the tack stitches 106 and 208 are sewn individually. For such webbing type attachment systems to work properly, all of the webbing strips 104 and 206 must be accurately aligned on the garment and each of the tack stitches 106 and 208 on each of the strips must be carefully aligned in order to provide proper registration of the strips and proper positioning of the channels 108 and 210. Such aligning and sewing is very labor intensive and hence, relatively expensive. Fixtures or jigs may be used to assist in holding the webbing strips in position and in making the tack stitches on the objects. However, the time and expense involved to produce and set up such equipment can also be costly. In addition, the cost to change the equipment setup from making one type of garment or modular accessory of the webbing type to making a different type of garment or modular accessory of the webbing type is relatively expensive, often making short production runs of webbing type equipment cost prohibitive.

Figure 3:
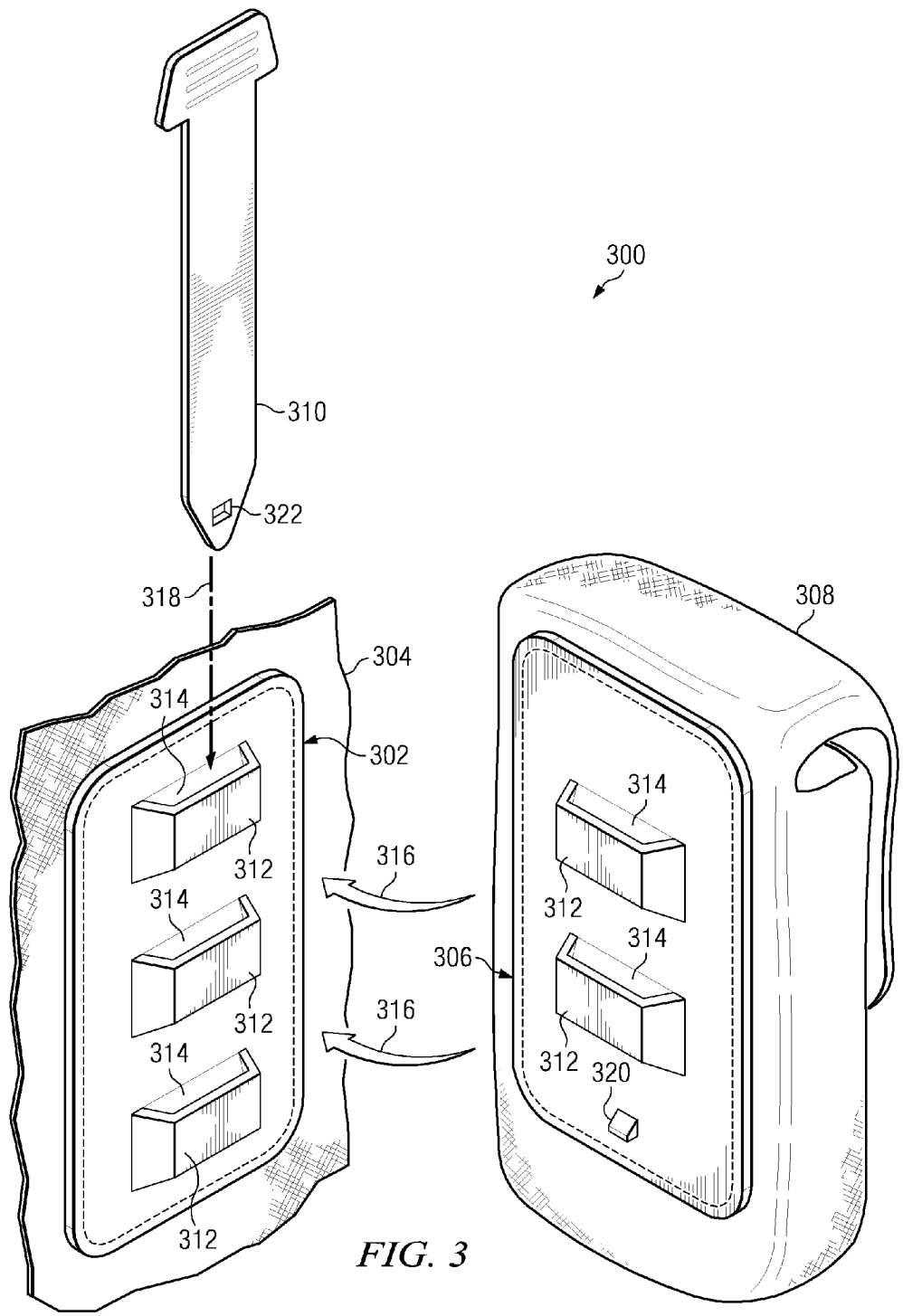
FIG. 3 shows a portion of a garment and a modular accessory fitted with an interlocking attaching system in accordance with one aspect of the current disclosure.

Referring now to FIG. 3, there is illustrated one embodiment of an interlocking attaching system in accordance with the disclosure. The attaching system 300 comprises a substrate adapter 302 which is affixed to the substrate object 304 (in this case a portion of a mesh vest), an accessory adapter 306 which is affixed to the accessory object 308 (in this case a modular pocket) and a discrete locking member 310. As will be further described in detail below, the top side of each adapter 302 and 306 has a plurality of raised regions 312 formed thereon at spaced apart locations disposed along a main axis. The raised regions have slots 314 formed in their sides that define a plurality of passages oriented parallel to their respective main axes and aligned with one another along respective passage axes. The spacing between the locations of the raised regions 312 of the adapters 302 and 306 are dimensioned such that, when the adapters are placed in operational alignment, i.e., with their respective top sides face-to-face and with their respective passages aligned with one another, at least one of the raised regions 312 of one of the adapters will be positioned between at least two of the raised regions 312 of the other adapter. In the example illustrated in FIG. 3, each of the two raised regions 312 on the accessory adapter 306 will be positioned between two of the raised regions 312 on the substrate adapter 302 when the two adapters are brought into operational alignment as indicated by the arrows 316. Obviously, the middle raised region 312 of the substrate adapter 302 will also be positioned between the two raised regions of the accessory adapter 306.

Once the two adapters 302 and 306 have been positioned in operational alignment, the locking member 310 can be inserted leading end first (as indicated by arrow 318) through the passages 412 and 512 of both adapters, whereby the accessory object 308 will be interlocked to the substrate object 304. Preferably, the accessory adapter 306 will include a first latching mechanism component 320 for co-acting with a second latching mechanism component 322 disposed on the locking member 310 so as to releasably secure the locking member in locking engagement with the accessory adapter when it is fully inserted. To release the accessory object 308 from the substrate object 304, the process is reversed, i.e., first disengaging the latching components 320 and 322 (if present), and then withdrawing the locking member 310 from the passages 412 and 512 in both adapters 302 and 306.

Referring now to FIGS. 4A-4D, the accessory adapter 306 is illustrated in greater detail. The accessory adapter 306 includes a generally flat base 402 having a bottom side 404 and a top side 406. The bottom side 404 of the base 402 is affixed to the accessory object 308, which will typically be a modular pocket, pouch or other such accessory. While most of the accessory objects 308 will be flexible, i.e., such as objects made from cloth or fabric, it will be appreciated that the accessory adapters 306 can also be affixed to more rigid accessories such as knife scabbards or holsters. The adapter base 402 will preferably be affixed to the accessory object 308 by sewing or stitching 408 around the periphery of the adapter 306, however, other means of attachment can be used, for example, adhesives, heat fusing or mechanical fasteners such as rivets or brads.

The raised regions or loops 312 are formed on the top side 406 of the base 402 and disposed upon a main axis 410. The raised regions 312 have slot 314 formed therethrough defining a series of passages 412 that are oriented parallel with the main axis 410 and aligned with one another along a passage axis 414. As previously described, the spacing between the locations of the raised regions 312 are dimensioned to coact (i.e., cooperate) with the spacing of the raised regions on the substrate adapter 302. Put another way, the width (denoted $W_A$) of the raised regions 312 and the spacing (denoted $S_A$) between the locations of the raised regions on the accessory adapter 306 are designed to coact or cooperate with the width (denoted $W_S$) of the raised regions and the spacing (denoted $S_S$) between the locations of the raised regions on the substrate adapter 302 in order to position at least one of the raised regions on one of the adapters between at least two of the raised regions on the other adapter when the two adapters are placed in operational alignment. Further, the height (denoted $H_A$) of the slots 314 on the accessory adapter 306 and the height (denoted $H_S$) of the slots on the substrate adapter 302 above the tops of their respective bases are selected such that when the adapters are in operational alignment, the passages on both adapters line up along a common axis.

In the embodiment illustrated in FIGS. 4A-4D, the raised regions 312 have a prismatic configuration, i.e., having flat sides 416 and flat tops 418. It will be appreciated, however, that the raised regions/loops 312 may be rounded or curved or have other shapes so long as the passages 412 therethrough are aligned along a passage axis 414.

Preferably, the accessory adapter 306 will also include a first latching component 320 that will cooperate with another latching component 322 on the locking member 310 in order to secure the locking member in place once the accessory object has been secured or mounted to the substrate object. In the embodiment shown, the first latching component 320 comprises a ramp-shaped feature positioned at the leading end of the accessory adapter 306. It will be appreciated however, that the latch component 320 may be positioned at either the leading or trailing end of the accessory adapter 306, and that alternative latch configurations known for manually operable latches may be substituted for the triangular ramp.

Although not required, it is preferred that the accessory adapter 306 be flexible so as to allow substantial bending in both the lateral and longitudinal directions as indicated by the arrows 422 and 424 in FIGS. 4B and 4C, respectively. This flexibility will allow the accessory adapter 306 to flex along with the pouch or other accessory object 308 to which it is attached. Also, while it is desirable that the accessory adapter 306 be made of a flexible material, it is also desirable that the raised regions 312 of the adapter are rigid enough such that the passages 412 remain open when the adapter bends. In other words, the passages 412 should remain open to allow the passage of the locking member 310 even when the adapter 306 is somewhat flexed.

The desired combination of overall flexibility and localized rigidity can be obtained by forming the accessory adapter 306 from polymer materials and by using a suitable design for the raised regions. Polymer materials believed to be most suitable for use with the accessory adapter 306 include nylons such as nylon 66, polypropylenes, and rubber-like thermoplastic polymer materials such as Santoprene® and sanoprene. It will be understood that these polymers will be used in "solid form" i.e., molded, formed or machined, and not woven from polymer fibers. Polymer materials are especially well suited for manufacturing the accessory adapter 306 as an integral one-piece article using injection molding, thermoforming, casting or similar known polymer-forming technologies. Other polymer-forming technologies, such as stereolithography, may also be used, although they are not economically advantageous at the present time.

It will be appreciated that manufacturing an accessory object 308 to use the attaching system can be done at substantial savings compared to prior art webbing type attachment systems. As previously described, webbing type attachment systems require numerous discrete components to be sewn onto the accessory object 308 using many individual tack stitches and other manufacturing operations. Using the accessory adapter 306, on the other hand, requires only that the base 402 be stitched or otherwise affixed onto the accessory object 308. No complicated setup or registration is required because the accessory adapter 306 can be slightly misaligned on the accessory object 308 without affecting its ability to interface with a substrate adapter. In other words, the registration and alignment of the raised portions 312 and the slots 314 of the accessory adapter 306 are "built in" rather than being dependent on the accuracy of the attachment operations.

Further, it will be appreciated that if the width $W_A$ and the spacing $S_A$ of the raised regions 312 on the accessory adapter 306 are properly selected, then the accessory adapter will interface with prior art webbing-type attaching systems as well as with substrate adapters as disclosed herein. For example, if the width $W_A$ is about one inch or less, and the spacing $S_A$ is about one inch, then the accessory adapter 306 may interlock onto existing military garments having standard one inch webbing-type attachment systems (e.g., the vest 100 of FIG. 1) without requiring any modification to the military equipment (although a locking member 310 must be used).

Further still, by forming the accessory adapter 306 from "solid" polymer materials (i.e., as opposed to woven materials), the adapter will not absorb any appreciable quantity of water, and thus will not gain weight like the prior art webbing-type systems when exposed to water, rain or perspiration. As previously discussed, this weight reduction (when wet) represents a significant advantage over the prior art.

The accessory adapter 306 illustrated in FIGS. 4A-4D is a one-piece molded article of the type typically formed using injection molding. A one-piece article, while not required, is preferred in order to simplify manufacturing and assembly. Similarly, construction of the accessory adapter 306 by injection molding is not required, however, it is also preferred in order to maximize manufacturing simplicity and assembly cost savings. In order to facilitate the injection molding of the accessory adapter 306 using an inexpensive two piece mold process, it may be desirable to leave a clear space 426 below each of the raised regions 312.

Referring now to FIGS. 5A-5D, the substrate adapter 302 is illustrated in greater detail. The substrate adapter 302 includes a generally flat base 502 having a bottom side 504 and a top side 506. Bottom side 504 of the base is affixed to the substrate object 304, which will typically be a load-bearing vest, duffle bag or other fabric garment worn or carried by a user. While most of the substrate objects 304 will be formed of flexible material, i.e., such as objects made from cloth or fabric, it will be appreciated that the substrate adapter 302 can also be affixed to rigid surfaces such as the interior of a building or vehicle where it is desirable to mount a modular accessory. Where the substrate object 304 is made of a flexible material such as cloth, the substrate adapter base 502 will typically be affixed to the object by sewing or stitching 508 around the periphery of the adapter. As with the accessory adapter, however, other means of attaching the substrate adapter base 502 to the accessory object can also be used, for example, adhesives, heat fusing or mechanical fasteners.

The raised regions or loops 312 are formed on the top side 506 of the substrate adapter base 502 and disposed along a main axis 510. As with the accessory adapter previously described, the raised regions 312 of the substrate adapter 302 have slots 314 formed therethrough defining a series of passages 512 oriented parallel to the main axis 510 and aligned with one another along a passage axis 514. The width $W_S$ of the raised regions 312, and the spacing $S_S$ between the locations of the raised regions, on the substrate adapter 302 are dimensioned to cooperate with the spacing of the raised regions on the accessory adapter 306. For example, the embodiment illustrated in FIGS. 5A-5D includes three raised regions 312 that are dimensioned to interfit on each side of, and in between, the two raised regions 312 of the accessory adapter 306 shown in FIGS. 4A-4D. The configuration of the raised regions on both the accessory adapter 306 and the substrate adapter 302 are configured such that the respective passage axes 414 and 514 are spaced a similar dimension above the surface of their respective bases 402 and 502 so that the slots will align vertically as well as longitudinally when the adapters are brought into operational alignment.

Figure 5A:
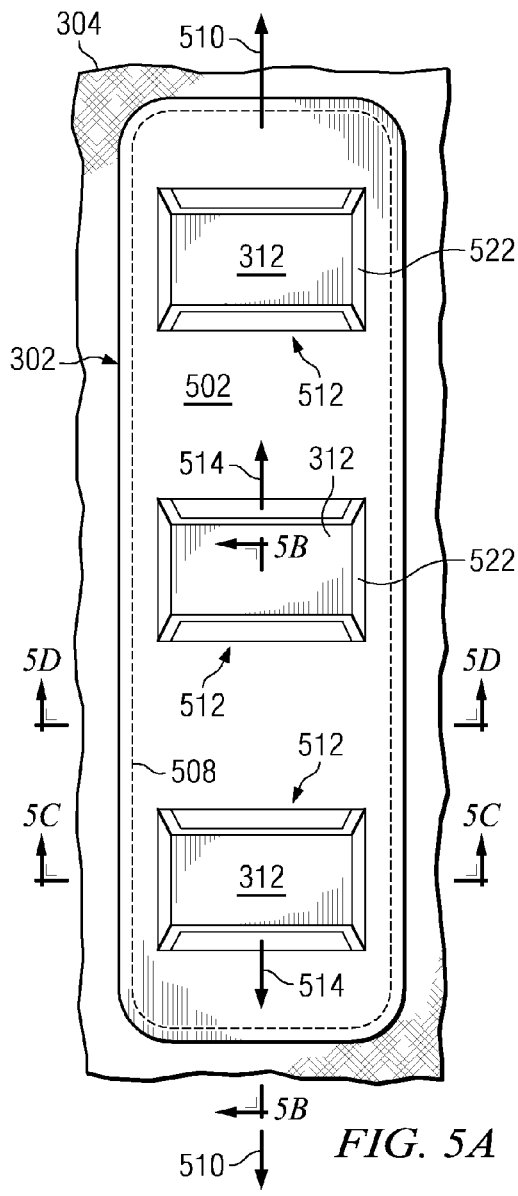
FIGS. 5A-5D illustrate additional details of the substrate adapter for the attaching system of FIG. 3. In particular.
Figure 5B:
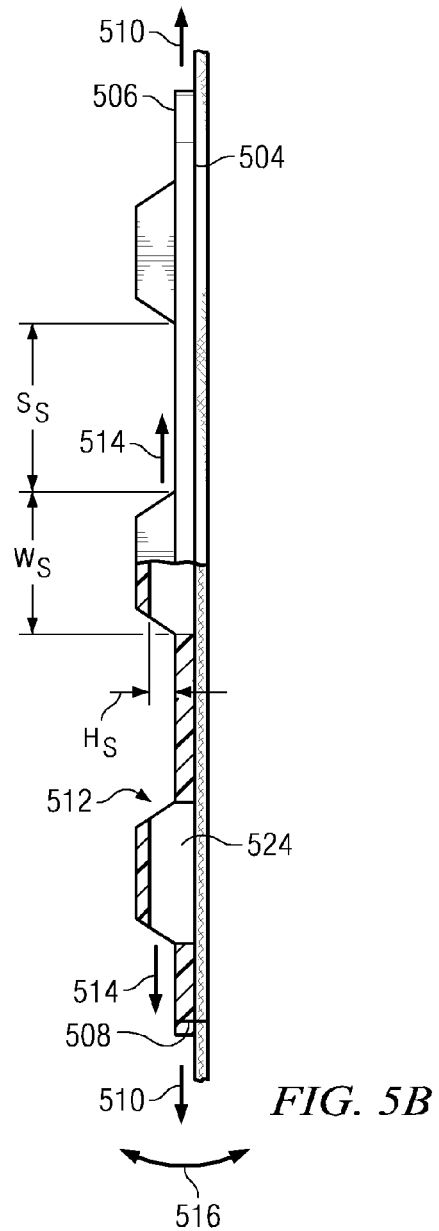
Figure 5C:
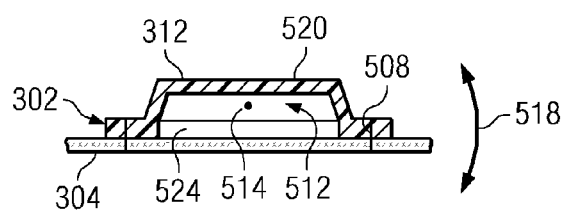
Figure 5D:
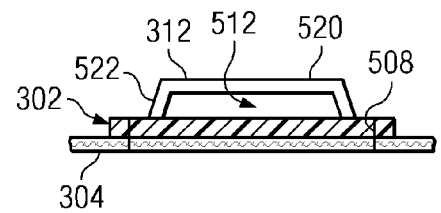

While not required, it is preferred that the substrate adapter 302 be flexible so as to allow substantial bending in both the lateral and longitudinal directions as indicated by the arrows 516 and 518 in FIGS. 5B and 5C. This flexibility will allow the substrate adapter 302 to flex along with the substrate garment 304 or other object to which it is attached. Also, as with the accessory adapter 306, while it is desirable that the substrate adapter 302 be made of a flexible material, it is also desirable that the raised regions 312 of the adapter be rigid enough such that the passages 512 will remain open to allow passage of the locking member 310 when the adapter flexes.

As with the accessory adapter 306, the desired combination of the overall flexibility and localized rigidity may be obtained by forming a substrate adapter 302 from a suitable polymer material and by selecting a suitable shape for the loops 312. It will be understood that these polymers will be used in solid form, and not woven from polymer fibers. Polymer materials believed to be most suitable for forming the substrate adapter 302 include nylons such as nylon 66, polypropylenes and rubber-like thermoplastic polymers. These polymer materials are especially well-suited for manufacturing the substrate adapter 302 using injection molding and other known polymer-forming technologies. These polymers are also well proven for use as fasteners and closures in garments and other flexible objects. By forming the substrate adapter 302 from solid polymer materials, the adapter will not absorb any appreciable quantity of water, and thus will not gain weight like the prior art webbing-type systems when exposed to water, rain or perspiration.

In the embodiment shown, the raised regions 312 on the substrate adapter 302 are prismatic, i.e., having flat sides 520 and flat tops 522 similar in configuration to the raised regions on the accessory adapter shown in FIGS. 4A-4D. It will be understood, however, that the raised regions/loops 312 on the substrate adapter 302 could be curved or have other shapes as long as the passages 512 are all aligned along a common passage axis 514. It will further be apparent that the raised regions 312 of the substrate adapter 302 and the accessory adapter 306 need not have identical configurations, but merely must be compatible in terms of raised region width, spacing between the raised regions, and height and width of the passages such that a single common passage is formed when the adapters are brought into operational alignment with their top sides together.

As previously discussed for the accessory adapter, it will be appreciated that adapting a substrate object to use the attachment system can be done at a substantial savings compared to using prior art webbing type attachment systems. Attaching the substrate adapter 302 requires only that the base 502 be stitched or otherwise affixed to the substrate object 304. As with the accessory adapter, no complicated setup or registration is required during manufacture because the substrate adapter 302 can be misaligned on a substrate object 304 without affecting its ability to interface with an accessory adapter. In other words, the registration and alignment of the raised portions 312 and the slots 314 of the substrate adapter 302 are built in rather than being produced by stitching during attachment to the substrate object.

If the width $W_S$ of the raised regions 312 and the spacing $S_S$ between the raised regions on the substrate adapter 302 are properly selected, then the substrate adapter may be interlocked with existing modular accessories designed for prior art webbing-type interlocking systems as well as with modular accessories equipped with the accessory adapter. For example, if the width $W_S$ is about one inch or less, and the spacing $S_S$ is about one inch, then the substrate adapter 302 may interlock with existing military accessories (e.g., the modular pocket 200 of FIG. 2) having standard one inch webbing-type attachment systems. No modification to the existing military accessories is required, and the standard straps 212 and fasteners 214 eliminate the need for a separate locking member.

The substrate adapter 302 illustrated in FIGS. 5A-5D is a one piece molded article of the type typically formed by injection molding. While not required, a one-piece article is preferred for ease of manufacture and assembly. Similarly, the use of injection molding to form the substrate adapter 302 is not required, but it is preferred because it typically reduces the costs of producing equipment utilizing the attachment system disclosed herein. In order to further facilitate the injection molding of the substrate adapter 302 using two piece molding technology, it may be desirable to leave a clear space 524 below each of the raised regions 312.

Figure 6A:
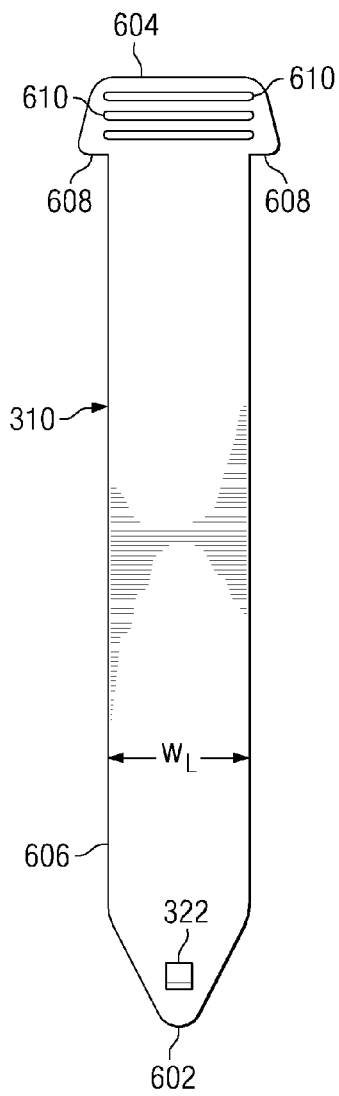
FIGS. 6A-6B illustrate additional details of the locking members for the attaching system of FIG. 3. In particular.
Figure 6B:
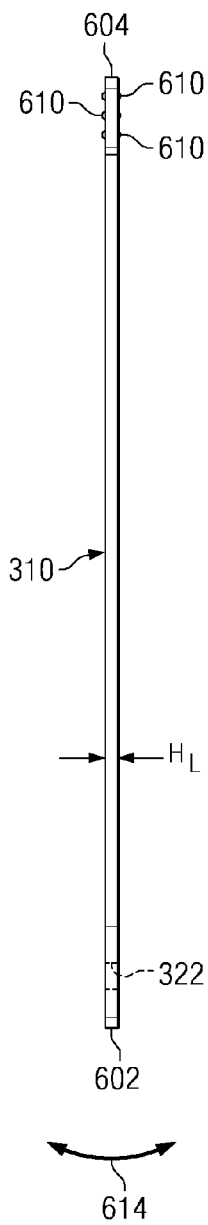

Referring now to FIGS. 6A and 6B, the locking member 310 is illustrated in greater detail. The locking member 310 is dimensioned to be removably insertable through the passages 412 and 512 on the raised regions 312 of the substrate and accessory adapters 302 and 306. Preferably, the locking member 310 will have a leading end 602 that is tapered or otherwise shaped to facilitate insertion through the passages 412 and 512. Further, the locking member 310 will preferably have a trailing end 604 designed to prevent the locking member from passing completely through the passages. In the embodiment shown, the main body 606 of the locking member 310 has a width WL and a height HL selected to allow the locking member to fit snugly within the passages 412 and 512 on the adapters 306 and 302, and the trailing end 604 has been extended to form a pair of flanges 608 which prevent the locking member from passing completely through the passages. The trailing end 604 also features a textured area 610 designed to provide a better gripping surface for withdrawing the locking member 310 from the slots.

Preferably, the locking member 310 will also include a second component 322 of the latching mechanism for releasably securing the locking member in place after it has been inserted into the accessory adapter. In the embodiment shown, the second component 322 of the latching mechanism comprises a square hole formed through the leading end 602 of the locking member 310 that engages the triangular ramp component 320 on the accessory adapter 306. It will be appreciated that this latching mechanism will automatically be engaged when the locking member 310 is fully inserted into the accessory adapter 306. Manual lifting of the locking member's leading end 602 will be required to disengage the latch components 322 and 320 in order to withdraw the locking member 310. In this way, the locking member 310 may be releasably secured without the need for expensive moving parts or additional components. Clearly, any number of other latch designs known in the art may be substituted for those illustrated and utilized to secure the locking member 310 to the accessory adapter 306. These latching components are preferably located at the leading end 602 or the trailing end 604 of the locking member.

The locking member 310 will preferably be formed of a material that is sufficiently stiff to allow the locking member to be inserted through the passages 412 and 512 solely by exerting force on the trailing end 604, facilitating the quick and simple interlocking of the system components. It is also desirable that the locking member 310 have sufficient flexibility to flex in the longitudinal direction as indicated by arrows 614. Suitable materials include polymer materials such as nylons and polypropylenes. Further, if the locking member 310 is relatively thin, then metal materials such as steel or aluminum sheet may be used for the locking member.

Figure 7:
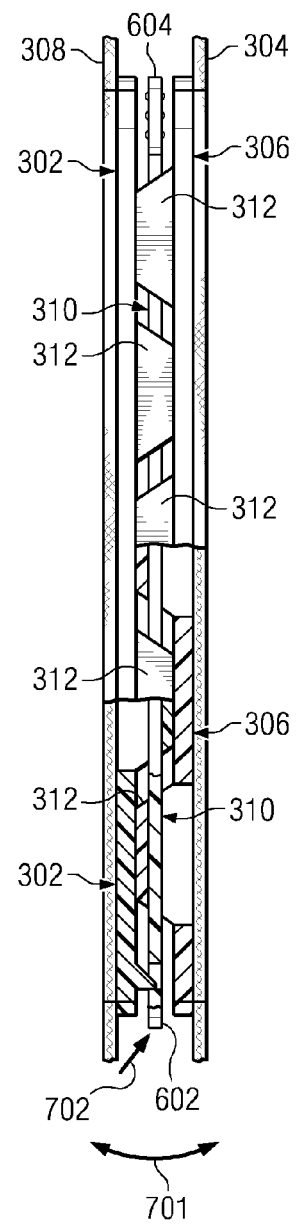
FIG. 7 is a side view of the components of the interlocking attaching system in the interlocked configuration, with portions shown in cross section.

Referring now to FIG. 7, an enlarged view is provided of the interlocking system 300 in its interlocked condition. The accessory adapter 306, which is affixed to a portion of the accessory object 308, is shown disposed face-to-face with the substrate adapter 302, which is affixed to a portion of a substrate object 304. The two adapters 302 and 306 are positioned in operational alignment such that the raised regions 312 on each adapter interfit between the raised regions of the other adapter, and the respective passage axes 414 and 514 of the adapters are aligned with one another. The locking member 310 has been inserted through the passages 412 and 512 of the two adapters until it is fully seated with the first latch component 320 engaging the second latch component 322. In this position, while the accessory object 308 is securely mounted to the substrate object 304, the entire assembly is still free to flex in both the lateral and longitudinal directions as noted by the arrows 701. To release the accessory object from the substrate object, the process is reversed, i.e., first the leading end 602 of the locking member 310 is raised by applying force at the tip as shown by the arrow 702 until the first latch component (ramp 320) disengages from the second latch component (hole 322). Next, the trailing end 604 of the locking member 310 is gripped and pulled completely out of the passages 412 and 512 of the two adapters, thereby releasing the accessory object 308 from the substrate object 304.

Figure 8:
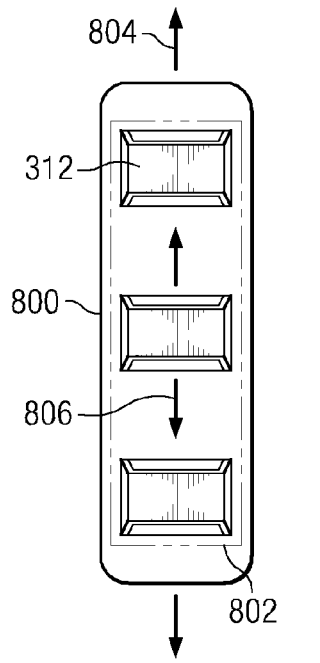
FIG. 8 illustrates a single-column substrate adapter in accordance with another aspect of the current disclosure.

Referring now to FIG. 8, there is illustrated a substrate adapter 800 similar in most respects to the adapter shown in FIG. 5A-5D. The spaced apart loops 312, disposed in a "column" running perpendicular to the loops themselves, may be considered to constitute a "loop column" 802 having a column axis 804 that is perpendicular to the loops. The common passage running through the loops 312 along the column axis 804 is termed a column passage 806.

Figure 9:
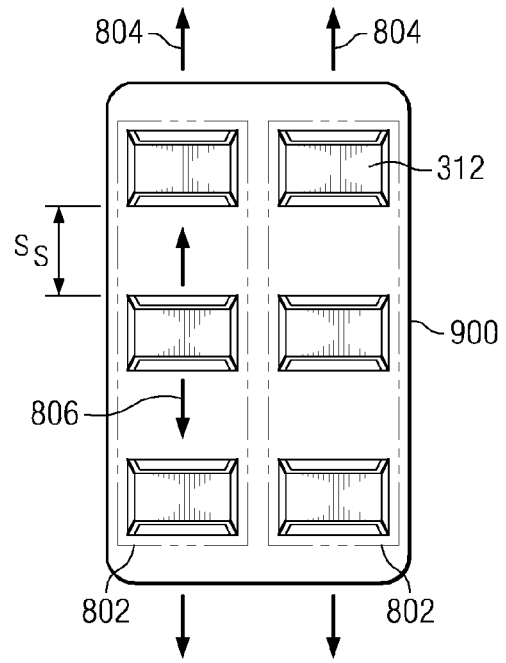
FIG. 9 illustrates a double-column substrate adapter in accordance with yet another aspect of the disclosure.
Figure 10:
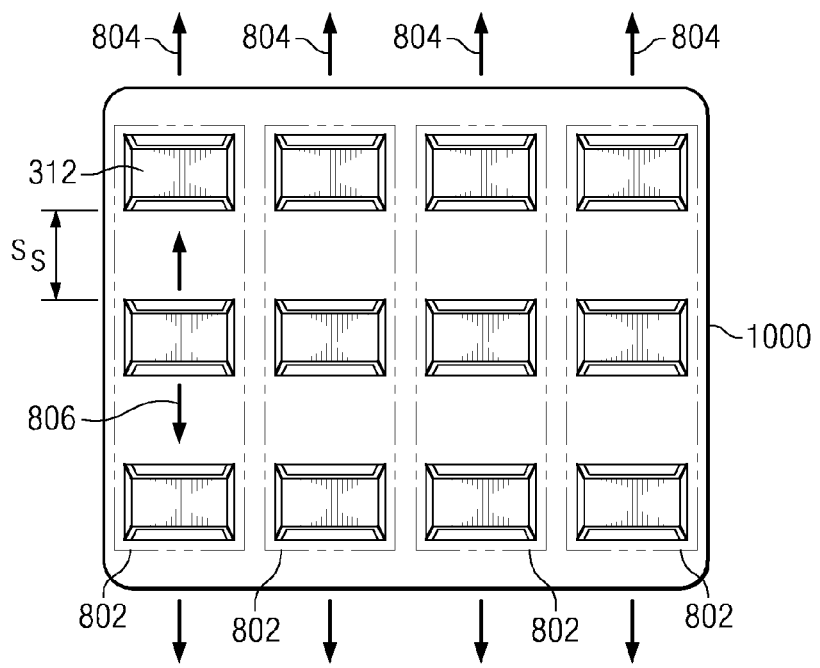
FIG. 10 illustrates a quad-column substrate adapter in accordance with still another aspect of the disclosure.

Referring now to FIGS. 9 and 10, there are illustrated substrate adapters 900 and 1000 in accordance with additional embodiments. The substrate adapter 900 is a "double-column" type having two loop columns 802 with parallel column axes 804 and having identical spacing $S_S$ between the loops 312 in adjacent loop columns, thereby creating three horizontal "rows" of loops. The substrate adapter 1000 is "quad-column" type having four loop columns 802 with parallel column axes 804 and having identical spacing $S_S$ between the loops 312 in adjacent loop columns, thereby also creating three horizontal "rows" of loops. It will be understood that, aside from the increased number of columns, the substrate adapters 900 and 1000 are substantially identical in all other respects to the single column substrate adapters 302 and 800 previously described. Thus, the double-column or quad-column substrate adapters 900 and 1000 may be attached to a substrate object by simply sewing or stitching around the perimeter of the base as with a single column embodiment. The double-column substrate adapter 900 will interlock with a pair of single-column accessory adapters 306 or alternatively, with a double-column accessory adapter (see FIG. 14). In a similar fashion, the quad-column substrate adapter 1000 will interlock with any combination of single, double- or quad-column accessory adapters.

Figure 11:
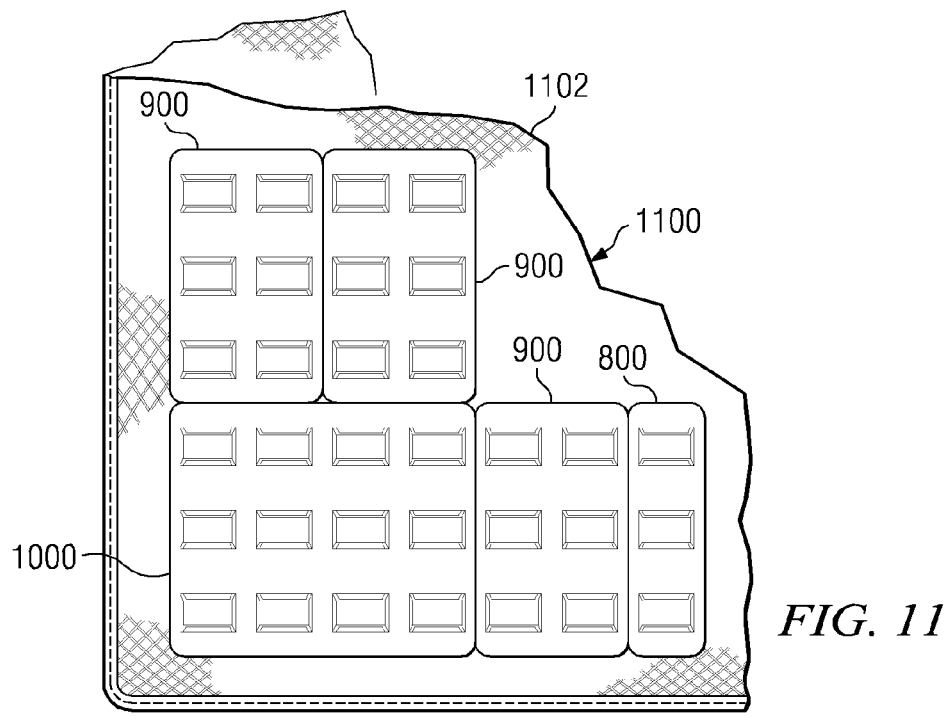
FIG. 11 illustrates a portion of a vest fitted with various substrate adapters of as disclosed herein.

Referring now to FIG. 11, there is shown a portion of a tactical load-bearing vest 1100 in accordance with another variation. The vest 1100 has a mesh body 1102, affixed to which are three dual-column substrate adapters 900, one quad-column substrate adapter 1000 and one single-column substrate adapter 800, covering essentially the entire surface area of the vest with usable mounting positions. It will further be appreciated that the manufacturing operations required to attach these substrate adapters (e.g., stitching around the perimeter of each adapter) is much lower than that required to provide a similar number of attachment points using prior art webbing based systems. Further, if the loop width, loop spacing and loop height of the substrate adapters 800, 900 and 1000 are appropriately dimensioned, then the tactical vest 1100 will be totally compatible with existing modular accessories which utilize the prior art webbing type attaching system as well as with modular accessories having accessory adapters as described herein.

Figure 12A:
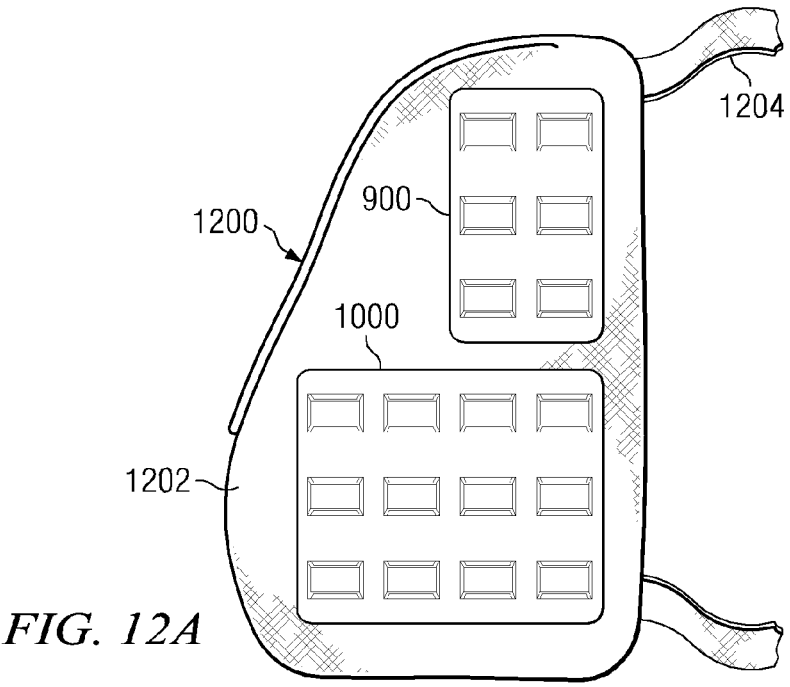
FIGS. 12A-12C illustrate a backpack fitted with various substrate adapters of the disclosure. In particular.
Figure 12B:
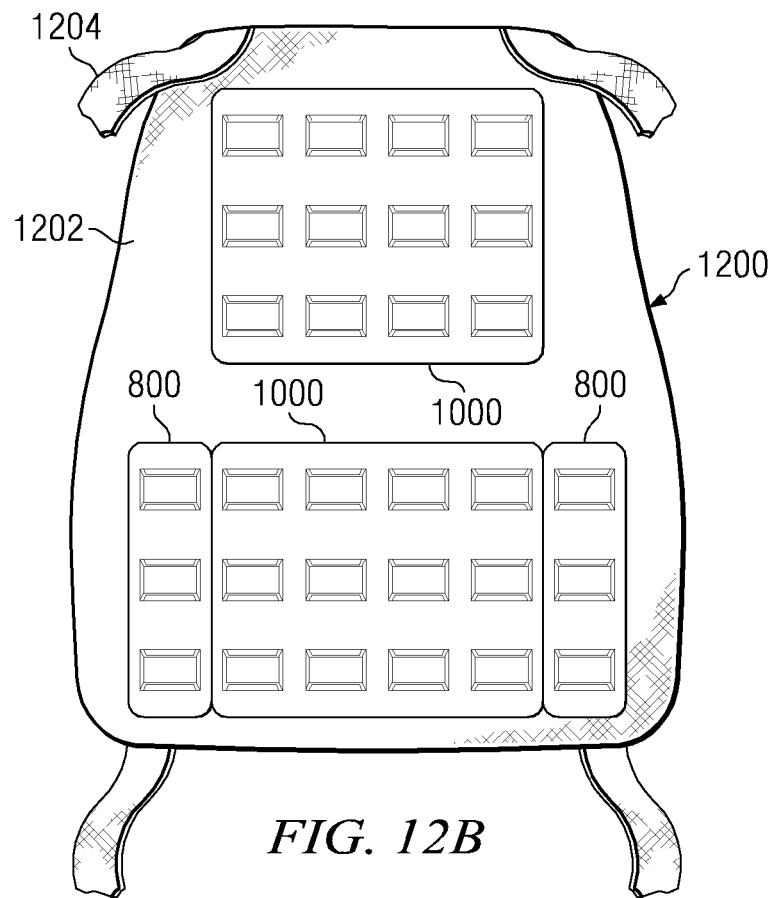
Figure 12C:
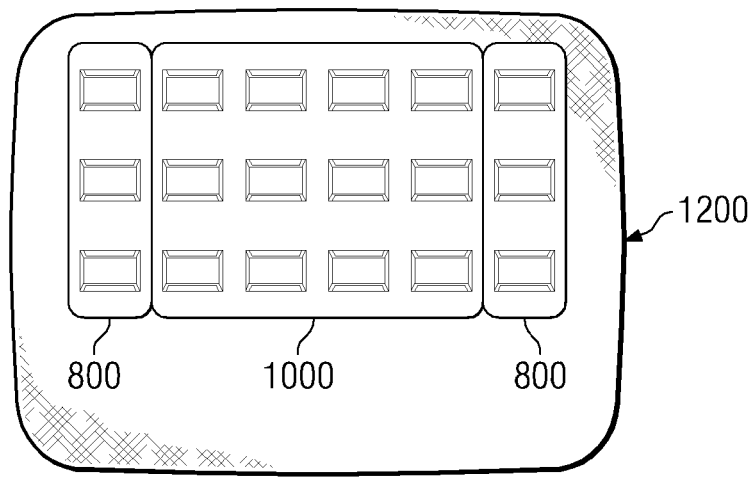

Referring now to FIGS. 12a-12c, a tactical backpack 1200 is shown. The backpack 1200 includes a fabric body 1202 and carrying straps 1204. Affixed to the rear, side and lower surfaces of the body 1202 are a variety of single-column, dual-column and quad-column substrate adapters as previously described. As with the tactical vest, use of the substrate adapters 800, 900 and 1000 will greatly simplify the manufacturing process compared to webbing-type systems. It will also allow the attachment of modular accessories having either the accessory adapters disclosed herein or the webbing type attaching system.

Figure 13:
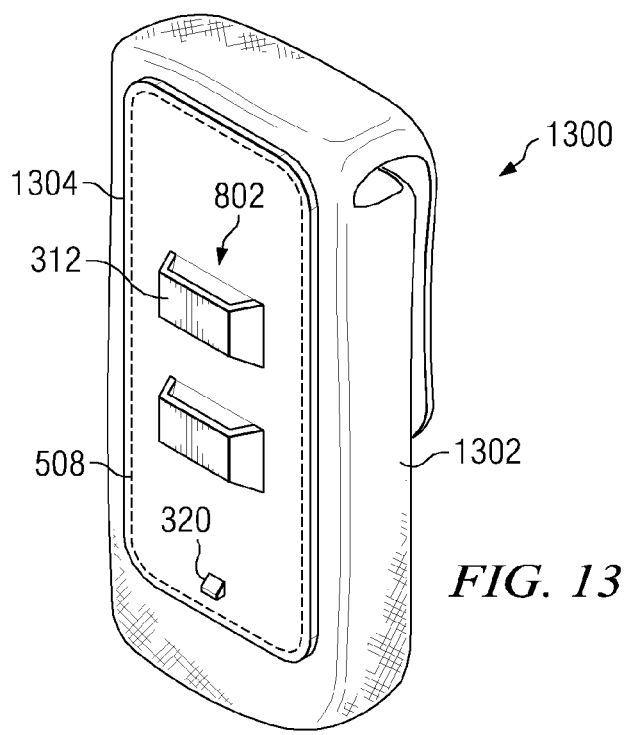
FIG. 13 is a modular pocket fitted with a single column accessory adapter in accordance with the disclosure.

Referring now to FIG. 13, there is shown a modular accessory, in this case a modular pocket 1300, in accordance with another aspect of the disclosure. The modular pocket 1300 includes a fabric body 1302 having an accessory adapter 1304 affixed to the rear side. The accessory adapter 1304 includes a single loop column 802 and one first latch component 320 as previously described. The accessory adapter 1304 is preferably affixed to the modular accessory 1300 by stitching around the periphery of its base, although other affixing means could be used as described herein. It will be appreciated that the modular accessory 1300 may be attached to single-, double- or quad-column substrate adapters 800, 900 and 1000 as previously described in FIGS. 8-10. In addition, when used with a locking member 310, the modular accessory 1300 may be used with standard military equipment having the prior art web-type attaching system.

Figure 14:
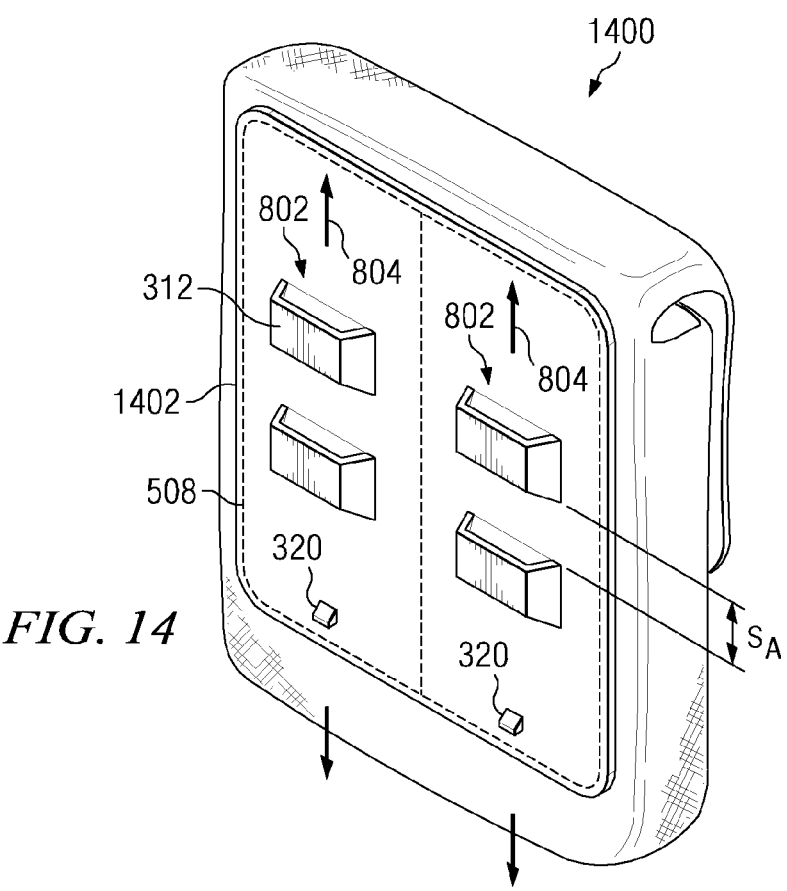
FIG. 14 is a modular pouch fitted with a dual-column accessory adapter in accordance with yet another aspect of the disclosure.

Referring now to FIG. 14, there is illustrated another modular accessory, in this case a modular pouch 1400 equipped with a dual-column accessory adapter 1402 having two loop columns 802. The loop columns 802 have parallel column axes 804 and identical spacing $S_A$ between the loops 312 in adjacent loop columns, thereby creating two horizontal "rows" of loops. In addition, a latching component 320 may be provided for each loop column 802 to receive a locking member 310 as previously discussed. The modular accessory 1400 equipped with a double column accessory adapter 1402 can be attached to double- or quad-column substrate adapters 900 or 1000 or, if properly dimensioned, to the prior art webbing based system. It will of course be understood that other accessory adapters having three, four or any other number of parallel loop columns 802 are contemplated.

As with the single column accessory adapters 306 and substrate adapters 302 previously described, the multi-column adapters 900, 1000 and 1402 are preferably made from a flexible material, for example, polymers such as nylon or polyethylene, or other polymer or elastomer materials. It will further be appreciated that maximum manufacturing savings is obtained when multi-column adapters are molded as single piece articles such as by injection molding. To that end, it will be understood that the multi-column adapters may include features such as the absence of a base under the raised regions that are designed to facilitate molding using two piece molds or other efficient injection molding equipment.

Referring now to FIGS. 15A-15F, there is illustrated an accessory adapter in accordance with another embodiment. The accessory adapter 1500 includes a generally flat base 1502 having a top side 1504 and a bottom side 1506. The bottom side 1506 is affixed to the accessory object (not shown). A recessed channel 1508 is formed around the periphery of base 1502 to provide a location for stitching if that method is used to affix the adapter to the accessory. As previously described, other means of affixing the adapter 1500 to the accessory object may be used, for example, adhesives, heat fusing or mechanical fasteners.

Figure 15A:
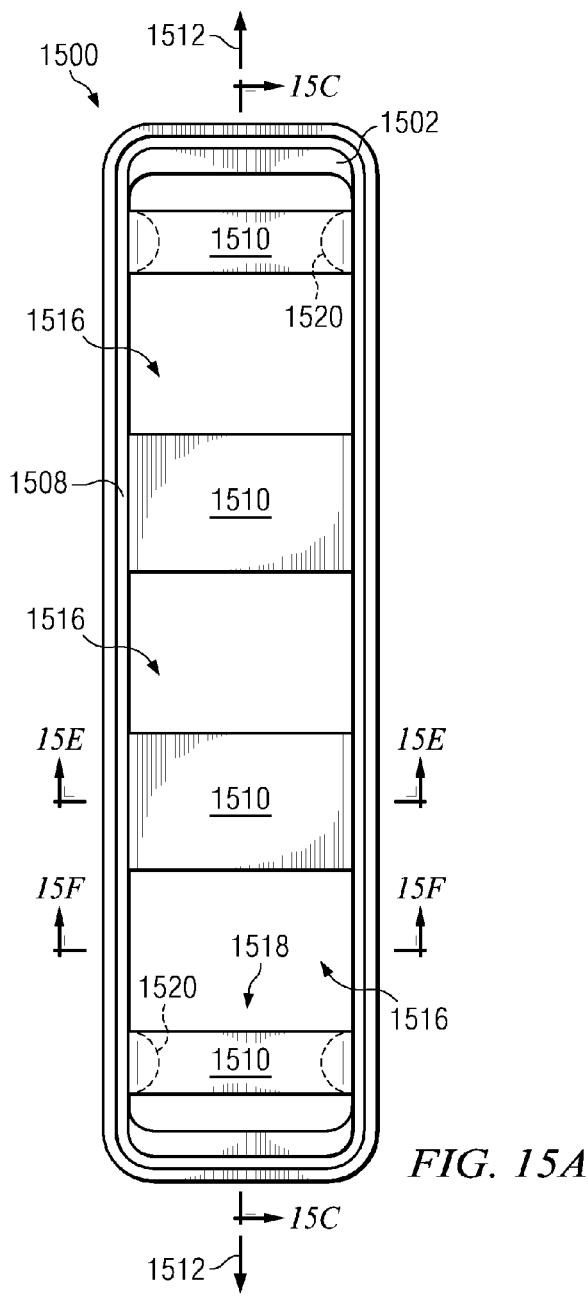
FIGS. 15A-15F illustrate an accessory adapter in accordance with another embodiment. In particular.
Figure 15B:
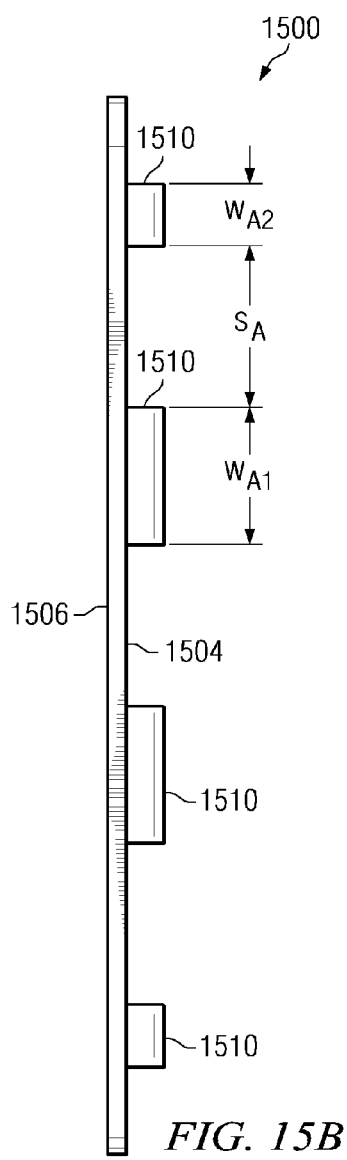
Figure 15C:
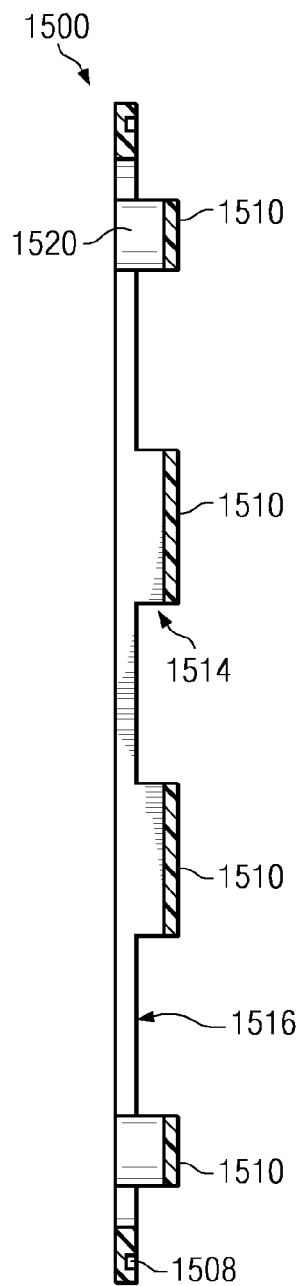
Figure 15D:
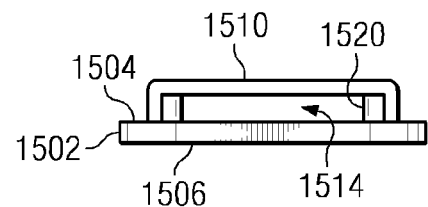
Figure 15E:
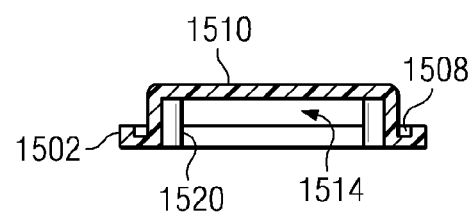
Figure 15F:
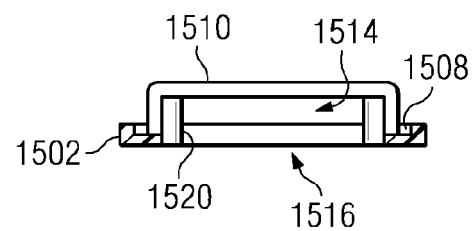

As with the accessory adapters previously described, a number of raised regions or loops 1510 are formed on a top side 1504 of base 1502 and spaced apart along a main axis 1512. The raised regions 1510 define a series of passages 1514 with respect to the base 1502 (as best seen in FIGS. 15D-15F). In the embodiment shown, the region of the base 1502 below the raised regions 1510 has been cut out to facilitate molding. It will be noted that the accessory adapter 1500 includes four raised regions 1510, and that the inner two raised regions have a width $W_{A1}$ that is different from the width $W_{A2}$ of the outer two raised regions. However, as previously described, the spacing $S_A$ between the locations of the raised regions 1510 are dimensioned to cooperate with the spacing of the raised regions of the substrate adapter in order to position at least one of the raised regions on one of the adapters between at least two of the raised regions on the other adapter when the two adapters are placed in operational alignment.

In contrast to the accessory adapters previously described, the base 1502 of the accessory adapter 1500 has cutouts (i.e., holes) 1516 formed between each of the raised regions 1510. These cutouts 1516 are dimensioned to receive therein a portion of the raised regions of the corresponding substrate adapter when the two adapters are brought into operational alignment. In other words, the raised regions 1510 of the substrate adapter may partially protrude into the cutouts 1516 in the accessory adapter. This configuration allows the overall thickness of the attachment system (i.e., the combined thickness of the substrate adapter and the accessory adapter when in operational alignment) to be minimized.

The accessory adapter 1500 includes a first latching component 1518 that will cooperate with a second latching component on the locking member in order to secure the locking member in place after the accessory object has been mounted to the substrate object. In the embodiment shown, the first latching component 1518 comprises a pair of rounded members 1520 extending into the passage 1514 underneath the outer two raised members 1510. As best seen in FIGS. 15D-15F, the rounded members 1520 narrow the passage 1514 beneath the outermost raised regions. As will be further described below, a suitably configured locking member (e.g. FIG. 17) will coact with the rounded members 1520 in order to secure the locking member in place. By placing a first latching component 1518 at each end of the accessory adapter 1500, the adapter becomes bi-directional. In other words, it may be locked by inserting the locking member from either direction. This bi-directional feature of the accessory adapter 1500 eliminates the need to determine which end should be positioned upwards when affixing the adapter to the accessory object. This will speed production and eliminate or reduce the number of errors made during production.

The accessory adapter 1500 illustrated in FIGS. 15A-15F is an integral, one-piece article of the type typically formed using injection molding. A one piece article, while not required, is preferred in order to simplify manufacture and assembly. Similarly, construction of the accessory adapter 1500 by injection molding is not required, however, it is also preferred in order to maximize manufacturing simplicity and assembly cost savings. The preferred materials for forming the accessory adapter 1500 are nylon, polypropylene and rubber-like thermoplastics, e.g., sanoprene. It will be understood that these polymers will be used in "solid form" i.e., molded, formed or machined, and not woven from polymer fibers.

Referring now to FIGS. 16A-16F, there is illustrated a substrate adapter in accordance with another embodiment. The substrate adapter 1600 is configured to cooperate with the accessory adapter 1500 previously described. It includes a generally flat base 1602 having a top side 1604 and a bottom side 1606. The bottom side 1606 of the base is affixed to the substrate object (not shown). A recessed channel 1608 is provided around the periphery of the base 1602 to facilitate stitching the adapter 1600 to the substrate if that method of affixing is used. In other embodiments, other means for affixing the adapter to the object may be used as previously described.

Figure 16A:
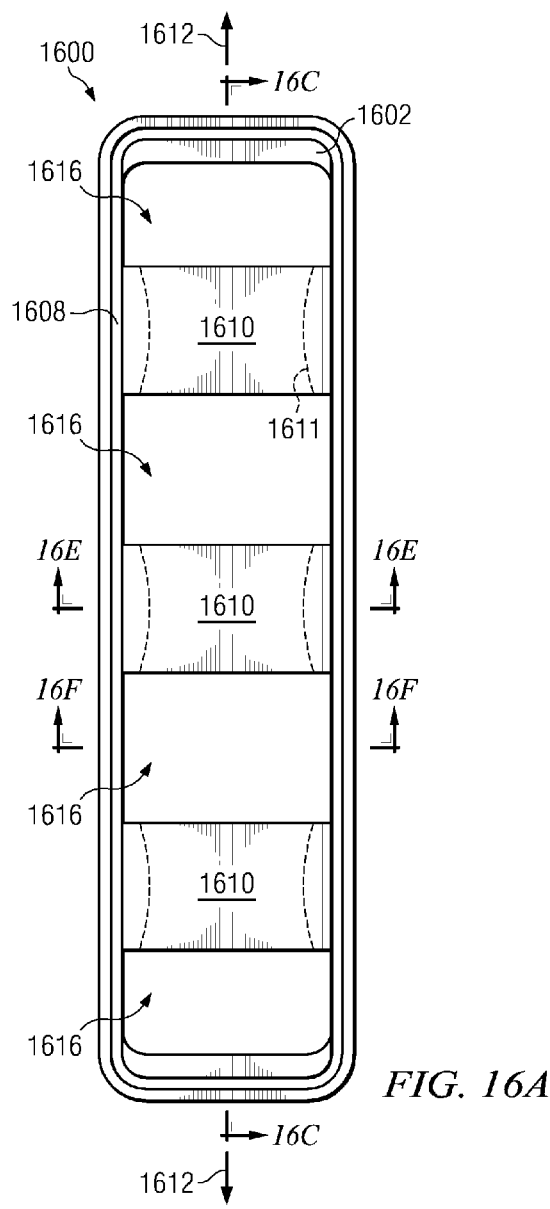
FIGS. 16A-16F illustrate a substrate adapter in accordance with yet another embodiment. In particular.
Figure 16B:
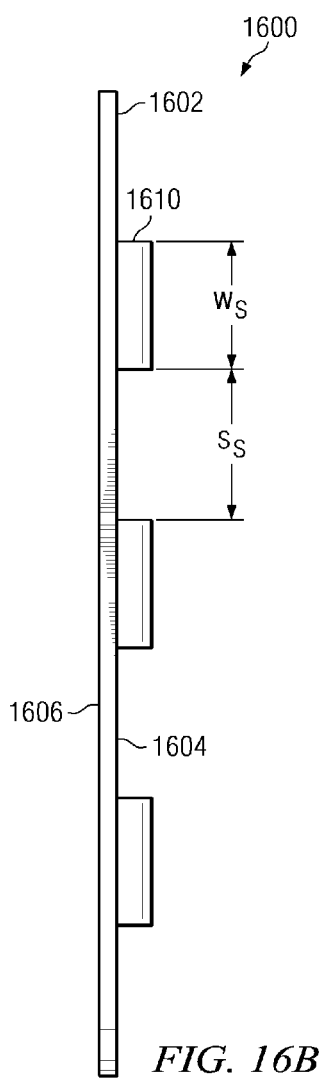
Figure 16C:
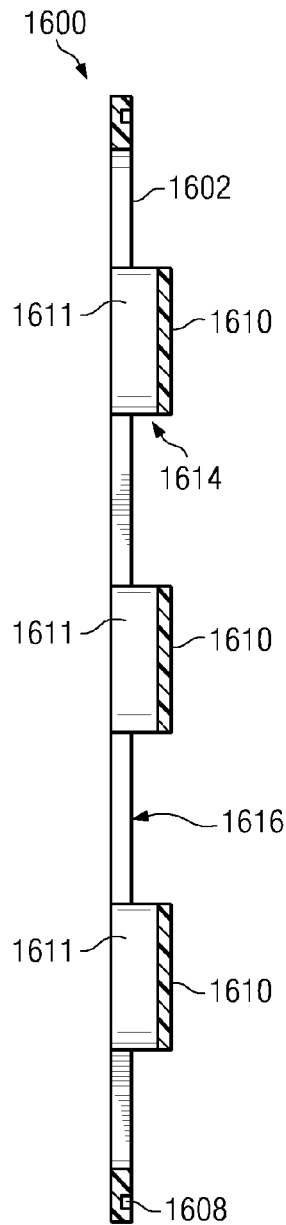
Figure 16D:
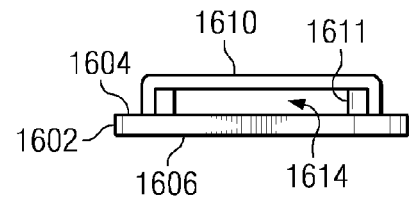
Figure 16E:
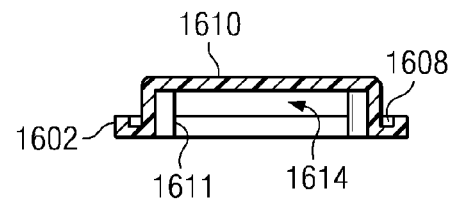
Figure 16F:
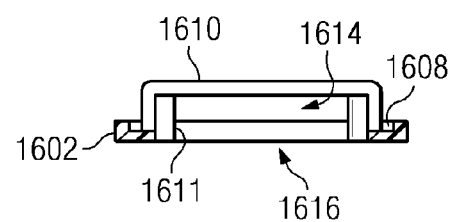

A series of raised regions or loops 1610 are formed on the top side 1604 of the adapter base 1602 and disposed along a main axis 1612. As with the accessory adapter 1500 previously described, the raised regions 1610 define a series of passages 1614 with respect to the base 1602 (as best seen in FIGS. 16D-16F). Optionally, guide members 1611 may be formed beneath the raised regions 1610 in order to help position the locking member in the center of the passages 1614 as it is inserted into the adapter. The passages 1614 are oriented parallel to the main axis 1612 and aligned with one another. The width $W_S$ of the raised regions 1610, and the spacing $S_S$ between the raised regions are dimensioned to cooperate with the spacing $S_A$ of the raised regions 1510 on the accessory adapter 1500. In the embodiment illustrated, there are three raised regions 1610 that are dimensioned to interfit between the four raised regions 1510 of the accessory adapter 1500 shown in FIGS. 15A-15F. The substrate adapter 1600 also includes cutouts 1616 formed in the base 1602 between the raised regions 1610. These cutouts 1616 are dimensioned to receive therethrough portions of the raised regions 1510 of the corresponding accessory adapter. Thus, the raised regions 1510 and 1610 of the two adapters may partially protrude into the cutouts 1616 and 1516, respectively, of each other when in operational alignment such that the height (i.e., thickness) of the combined assembly is minimized. The configurations of the raised regions on both the accessory adapter 1500 and the substrate adapter 1600 are configured such that the respective passages 1514 and 1614 will be aligned vertically as well as longitudinally when the adapters are brought into operational alignment.

The substrate adapter 1600 illustrated in FIGS. 16A-16F is a one piece molded article of the type typically formed by injection molding. While not required, a one piece article is preferred for ease of manufacturing and assembly. As previously discussed, injection molding is not required to form the substrate adapter 1600 but is preferred due to the cost savings typically associated with that type of production. Polymer materials believed to be most suitable for forming the substrate adapter 1600 include nylons such as nylon 66, polypropylenes and flexible thermoplastics. It will be understood that these polymers are used in solid form, and not woven from polymer fibers.

Figure 17:
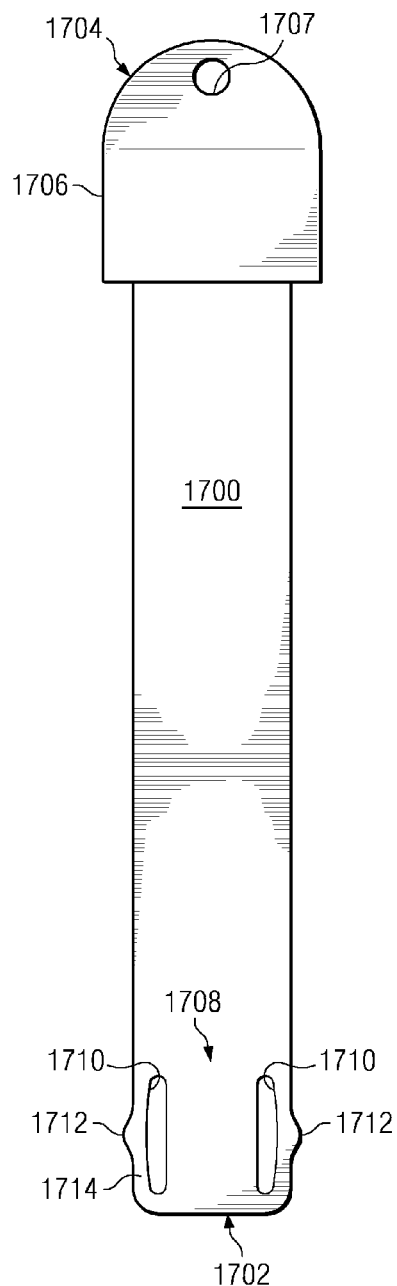
FIG. 17 illustrates a locking member for use with the adapters of FIGS. 15A-F and 16A-F.

Referring now to FIG. 17, there is illustrated a locking member suitable for use with the accessory adapter 1500 and substrate adapter 1600 previously described. The locking member 1700 is dimensioned to be removably insertable through the passages 1514 and 1614 under the raised regions 1510 and 1610 of the accessory and substrate adapters 1500 and 1600, respectively. The locking member 1700 has a leading end 1702 for insertion through the passages 1514 and 1614. The locking member 1700 further has a trailing end 1704 designed to prevent the locking member from passing completely through the passages. In the embodiment shown, the trailing end 1704 includes a handle 1706 that may be sized and/or textured to allow the user to grip the locking member 1700 even when wearing gloves. A hole 1707 may be provided in the handle 1706 for receiving a tether cord (not shown) that may be connected to the accessory to prevent loss of the locking member 1700.

The locking member 1700 also includes a second latching component 1708 of the latching mechanism for releasably securing the locking member in place after it has been inserted into the accessory adapter 1500. In this embodiment, the second latching component 1708 comprises a pair of holes 1710 and a pair of lateral projections 1712 both formed on the leading end 1702 of the locking member. The holes 1710 form a thinned region 1714 on each side of the locking member. This thinned region 1714 is flexible enough to allow the projections 1712 to move laterally inward as they pass the first latching components 1520 on the accessory adapter and then spring back into position after passing the projections 1520 in order to secure the locking member in position.

Figure 18:
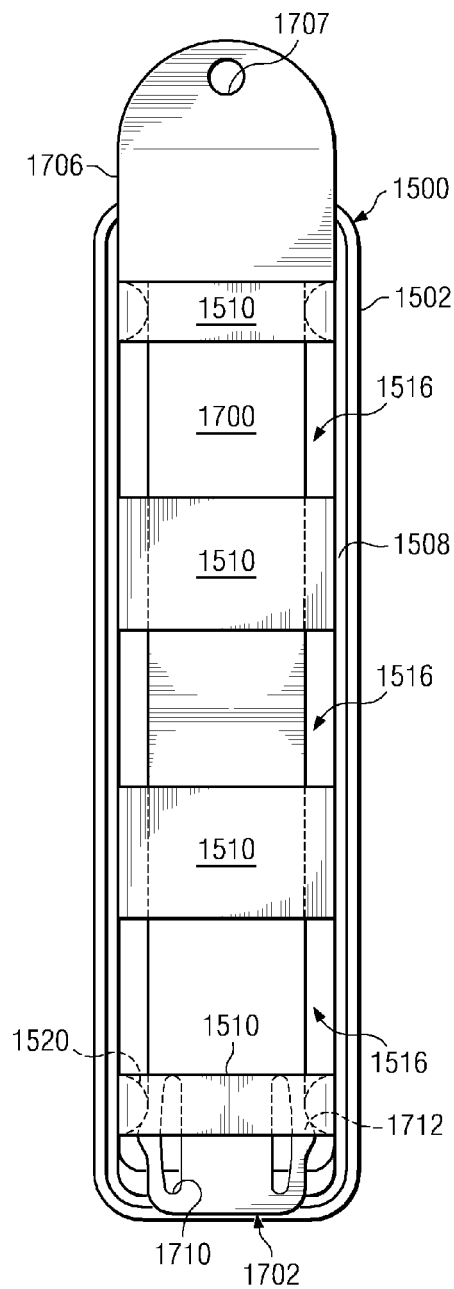
FIG. 18 is a top view of the locking member of FIG. 17 operably inserted into the accessory adapter of FIG. 15A.

Referring now to FIG. 18, the locking member 1700 is shown in its inserted and secured position within accessory member 1500. In particular, it can be seen how the projections 1712 at the leading end 1702 of the locking member cooperate with the rounded members 1520 of the accessory adapter in order to secure the locking member in place. It will be appreciated that the locking member 1700 can be inserted from either end of the accessory adapter 1500 and will lock securely due to the bi-directional locking features of the adapter.

Figure 19:
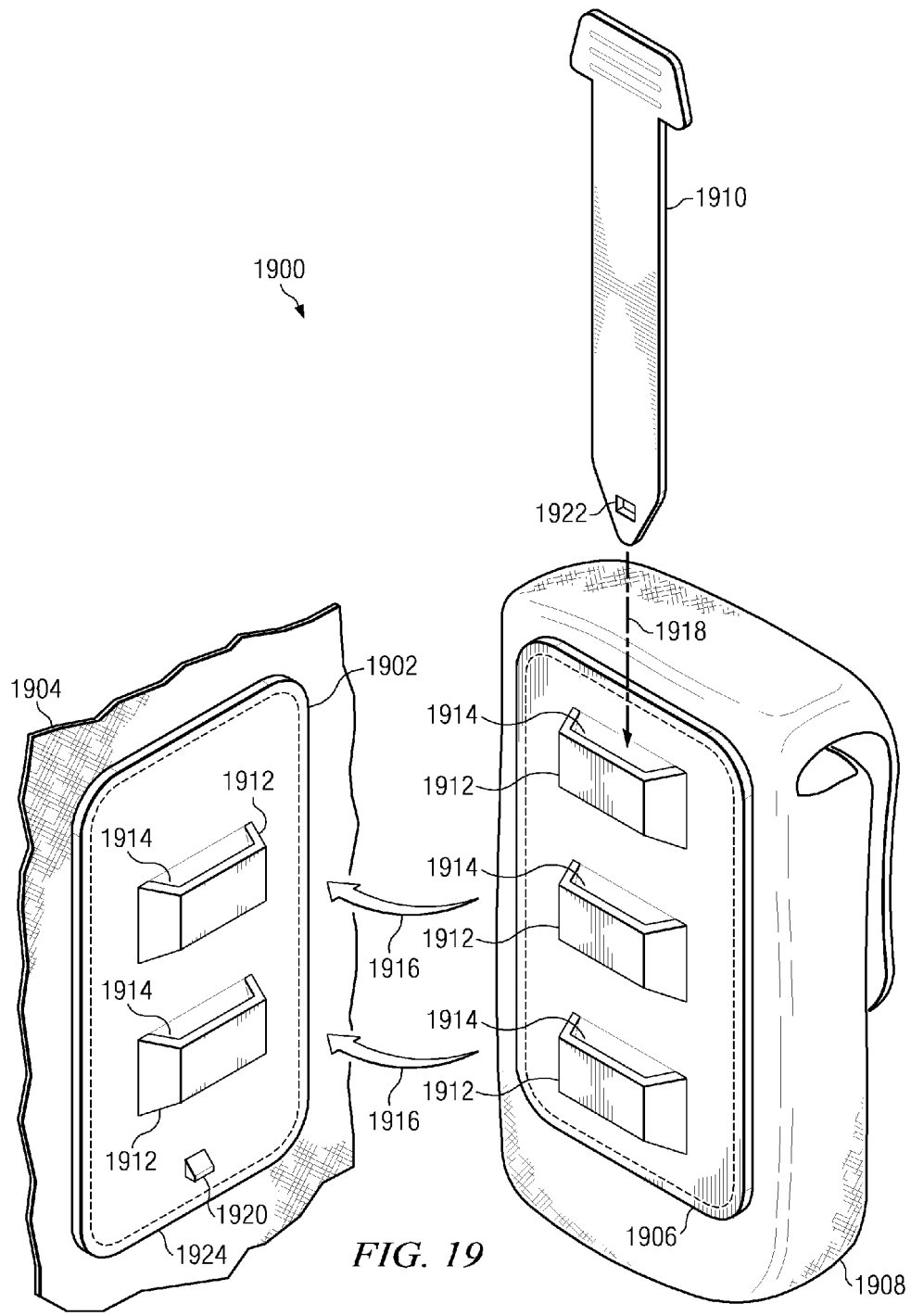
FIG. 19 is another view of a portion of a garment and a modular accessory fitted with an interlocking attaching system in accordance with disclosure.

Referring now to FIG. 19, there is illustrated another embodiment of an interlocking attaching system 1900 in accordance with the disclosure. The attaching system 1900 is substantially similar to the attaching systems previously described herein, particularly the attaching system 300 of FIG. 3. The attaching system 1900 comprises a substrate adapter 1902 which is affixed to a substrate object 1904 (in this case a portion of a mesh vest), an accessory adapter 1906 which is affixed to an accessory object 1908 (in this case a modular pocket) and a discrete locking member 1910. As will be further described in detail below, the top side of each adapter 1902 and 1906 has a plurality of raised regions 1912 formed thereon at spaced apart locations disposed along a main axis. The raised regions have slots 1914 formed in their sides that define a plurality of passages oriented parallel to their respective main axes and aligned with one another along respective passage axes.

The spacing between the locations of the raised regions 1912 of the adapters 1902 and 1906 are dimensioned such that, when the adapters are placed in operational alignment, i.e., with their respective top sides face-to-face and with their respective passages aligned with one another, at least one of the raised regions 1912 of one of the adapters will be positioned between at least two of the raised regions 1912 of the other adapter. In the example illustrated in FIG. 19, each of the two raised regions 1912 on the substrate adapter 1902 will be positioned between two of the raised regions 1912 on the accessory adapter 1906 when the two adapters are brought into operational alignment as indicated by the arrows 1916. Obviously, the middle raised region 1912 of the accessory adapter 1906 will also be positioned between the two raised regions of the substrate adapter 1902.

Once the two adapters 1902 and 1906 have been positioned in operational alignment, the locking member 1910 can be inserted leading end first (as indicated by arrow 1918) through the passages 1914 of both adapters, whereby the accessory object 1908 will be interlocked to the substrate object 1904. In the present embodiment, the substrate adapter 1902 will include a first latching mechanism component 1920 for co-acting with a second latching mechanism component 1922 disposed on the locking member 1910 so as to releasably secure the locking member in locking engagement with the accessory adapter when it is fully inserted. In the illustrated embodiment, first latching mechanism component 1920 comprises a wedge extending from base 1924 of substrate adapter 1902 and second component 1922 of the latching mechanism comprises an aperture or hole formed through locking member 1910 that is adapted to receive the wedge. To release the accessory object 1908 from the substrate object 1904, the process is reversed, i.e., first disengaging the latching components 1920 and 1922 (if present), and then withdrawing the locking member 1910 from the passages 1914 in both adapters 1902 and 1906.

The system 1900 is illustrated in FIG. 19 with the first latching mechanism component 1920 disposed on the substrate adapter 1902. This configuration allows such substrate adapters to be attached to conventional webbing-type accessories (e.g., as shown in FIG. 2) using the locking member 1910 as well as to accessory adapters as disclosed herein. It will be appreciated that in alternative embodiments of the system 1900 the first latching mechanism component 1920 may be disposed at an appropriate position on the accessory adapter 1906 instead of on the substrate adapter 1902. In such alternative embodiments (not shown), the first latching mechanism component 1920 will co-act with the second latching mechanism component 1922 (disposed on the locking member 1910) in substantially the same way as previously described to releasably secure the locking member 1910 in locking engagement with the accessory adapter when it is fully inserted. The configuration of the first latching mechanism component 1920 and operation of the latching mechanism remains as previously described. Disposing the first latching component 1920 on the accessory adapter 1906 instead of the substrate adapter 1902 allows such accessory adapters to be attached to conventional webbing-type substrates using the locking member 1910 as well as to substrate adapters as disclosed herein.

Figure 20:
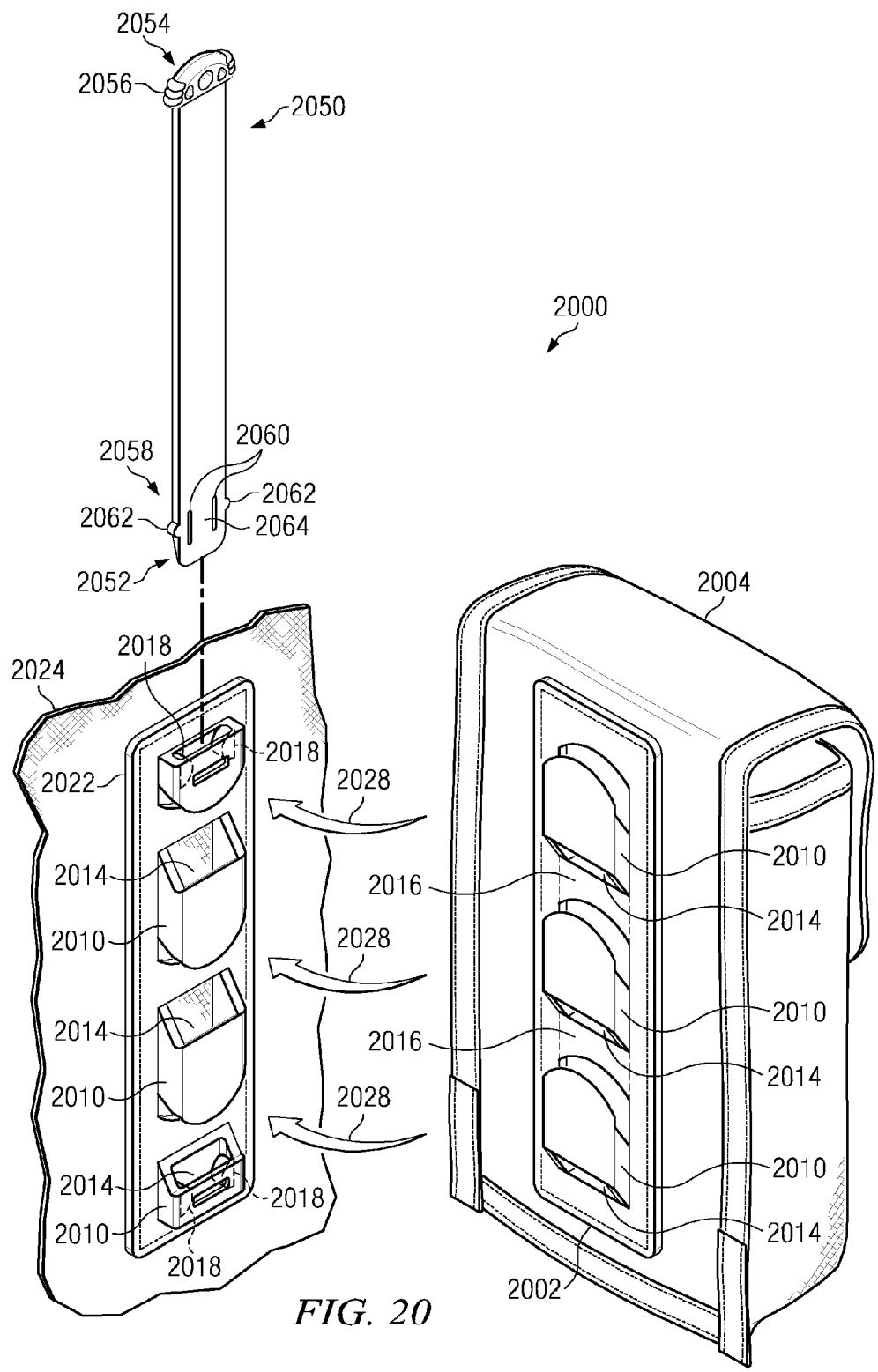
FIG. 20 is yet another view of a portion of a garment and a modular accessory fitted with an interlocking attaching system in accordance with aspects disclosed herein.

Referring now to FIG. 20, yet another interlocking attaching system in accordance with disclosure is illustrated. The attaching system 2000 uses components substantially similar to the attaching systems previously described herein, particularly the attaching system of FIGS. 15-18. The accessory adapter 2002 (similar to the substrate adapter 1600 previously described) is affixed to the accessory object 2004 (in this case a modular pocket) as previously described. Also, as with the accessory adapters previously described, a number of raised regions or loops 2010 are formed on the accessory adapter 2002 and spaced apart along its main axis. The raised regions 2010 define a series of passages 2014 with respect to the accessory adapter 2002. In the embodiment shown, the region of the base 2002 below the raised regions 2010 has been cut out to facilitate molding. As previously described, the spacing between the locations of the raised regions 2010 on the accessory adapter 2002 are dimensioned to cooperate with the spacing of the raised regions 2010 of the substrate adapter 2022 in order to position at least one of the raised regions 2010 on one of the adapters between at least two of the raised regions 2010 on the other adapter when the two adapters are placed in operational alignment.

As previously described, the accessory adapter 2002 optionally has cutouts 2016 (i.e., holes) formed between each of the raised regions 2010. These cutouts 2016 may be dimensioned to receive therein a portion of the raised regions 2010 of the corresponding substrate adapter 2022 when the two adapters 2002, 2022 are brought into operational alignment as indicated by arrows 2028. In other words, the raised regions 2010 of the substrate adapter 2022 may partially protrude into the cutouts 2016 in the accessory adapter 2002. This configuration allows the overall thickness of the attachment system 2000 (i.e., the combined thickness of the substrate adapter and the accessory adapter when in operational alignment) to be minimized. In another embodiment, the substrate adapter 2022 may feature holes in addition to, or instead of, the holes 2016 of the accessory adapter 2002.

The substrate adapter 2022 (similar to the accessory adapter 1500 previously described) is configured to cooperate with the accessory adapter 2002. The substrate adapter 2022 is affixed to the substrate 2024 (in this case a portion of a mesh vest). A series of raised regions or loops 2010 are formed on the substrate adapter 2022 and disposed along its main axis. As with the substrate adapters previously described, the raised regions 2010 define a series of passages 2014 with respect to the substrate adapter 2022. The width and spacing of the raised regions 2010 of the substrate adapter 2022 are dimensioned to cooperate with width and spacing of the raised regions 2010 of the accessory adapter 2002. In the embodiment illustrated, there are three raised regions 2010 on the accessory adapter 2002 that are dimensioned to interfit between the four raised regions 2010 of the accessory adapter 2022.

The substrate adapter 2022 may include first latching components 2018 that cooperate with a second latching component on the locking member 2050 in order to secure the locking member in place after the accessory object 2004 has been mounted to the substrate object 2024. In the embodiment shown, the first latching component 2018 comprises a pair of rounded members or projections extending into the passage 2014 underneath the outer two raised members 2010, similar in construction to the rounded members 1520 shown in FIGS. 15D-15F. By placing first latching components 2018 at each end of the substrate adapter 2022, the adapter becomes bi-directional.

The locking member 2050 is dimensioned to be removably insertable through the passages 2014 of the raised regions 2010 of the accessory adapter 2002 and substrate adapter 2022. The locking member 2050 has a leading end 2052 for insertion through the passages 2014. The locking member 2050 further has a trailing end 2054 designed to prevent the locking member 2050 from passing completely through the passages 2014. In the embodiment shown, the trailing end 2054 includes a handle 2056 that may be sized and/or textured to allow the user to grip the locking member 2050 even when wearing gloves. The locking member 2050 may also be tethered to the substrate adapter 2022 to prevent loss of the locking member 2050.

The locking member 2050 also includes a second latching component 2058 of the latching mechanism for releasably securing the locking member 2050 in place after it has been inserted into the substrate adapter 2022. In this embodiment, the second latching component 2058 comprises a pair of holes 2060 and a pair of lateral projections 2062 both formed on the leading end 2052 of the locking member 2050. The holes 2060 form a thinned region 2064 on each side of the locking member 2050. This thinned region 2064 is flexible enough to allow the projections 2062 to move laterally inward as they pass the first latching components 2018 on the accessory adapter 2022 and then spring back into position after passing the projections 2018 in order to secure the locking member 2050 into position.

The system 2000 is illustrated in FIG. 20 with the first latching components 2018 disposed on the substrate adapter 2022. This configuration allows such substrate adapters to be attached to conventional webbing-type accessories (e.g., as shown in FIG. 2) using the locking member 2050 as well as to accessory adapters as disclosed herein.

Figure 21A:
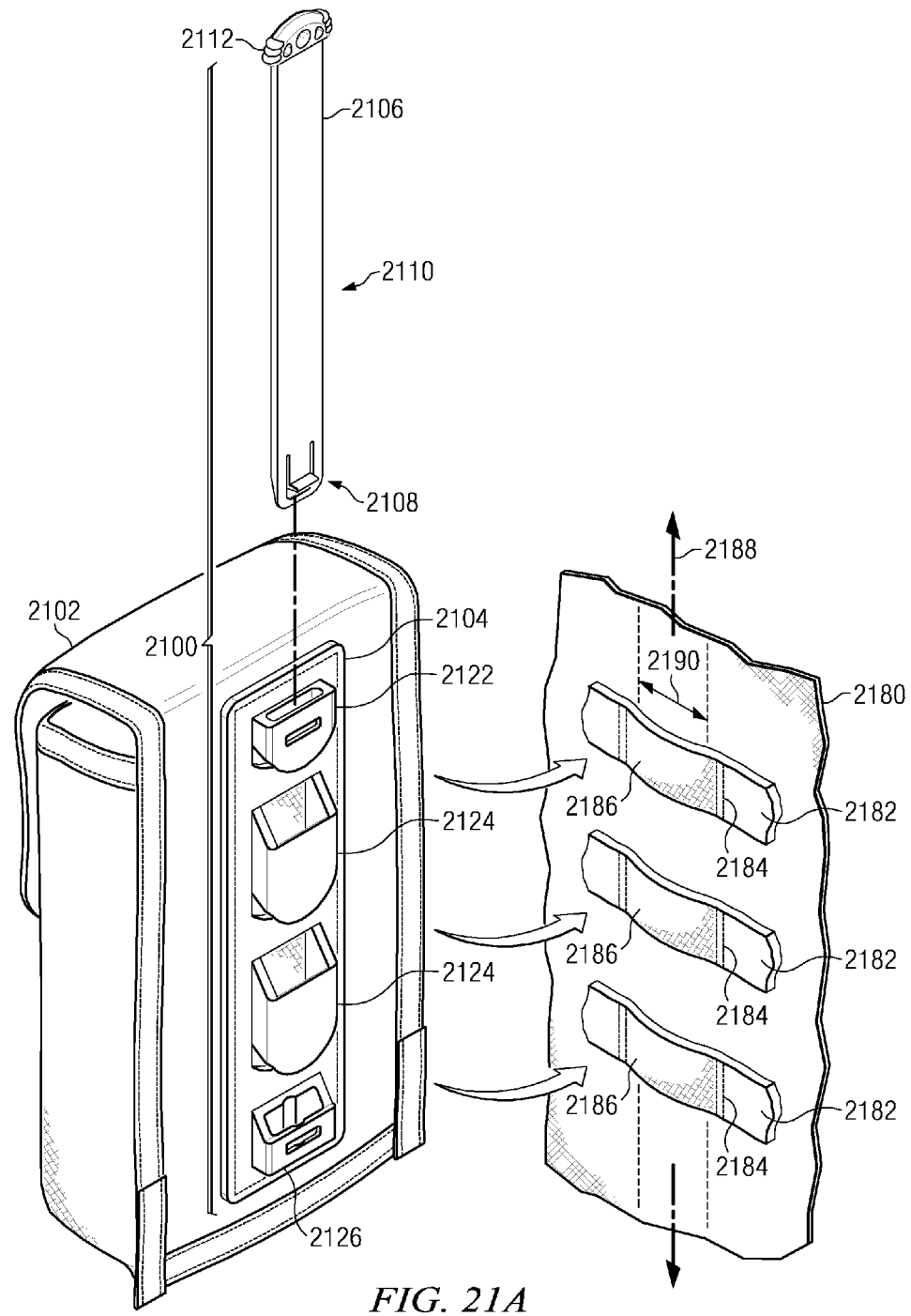
FIG. 21A is a perspective view of another attachment system mounted on a modular accessory in accordance with the current disclosure.
Figure 21B:
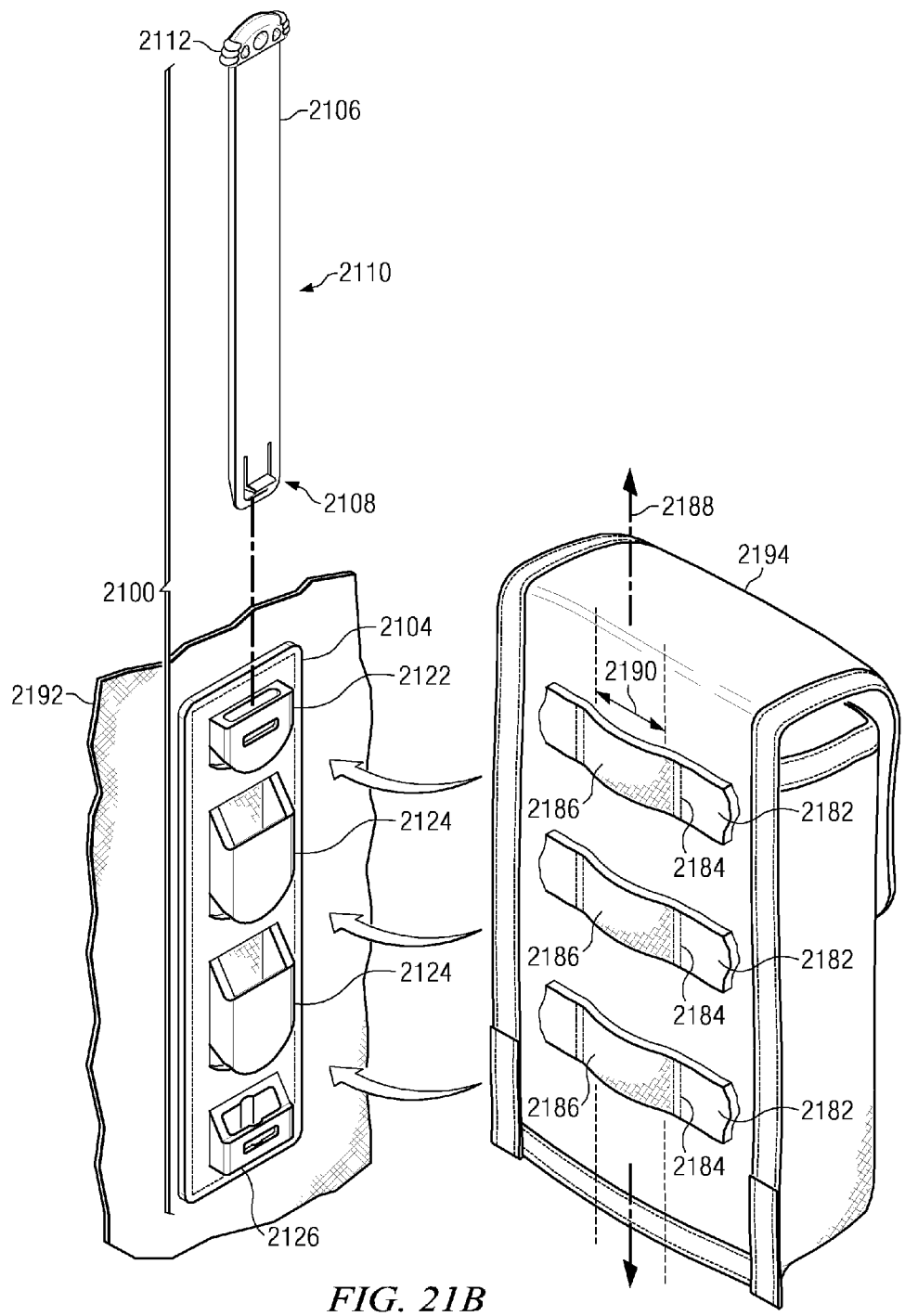
FIG. 21B is a perspective view of the attachment system of FIG. 21A mounted on a substrate.
Figure 21C:
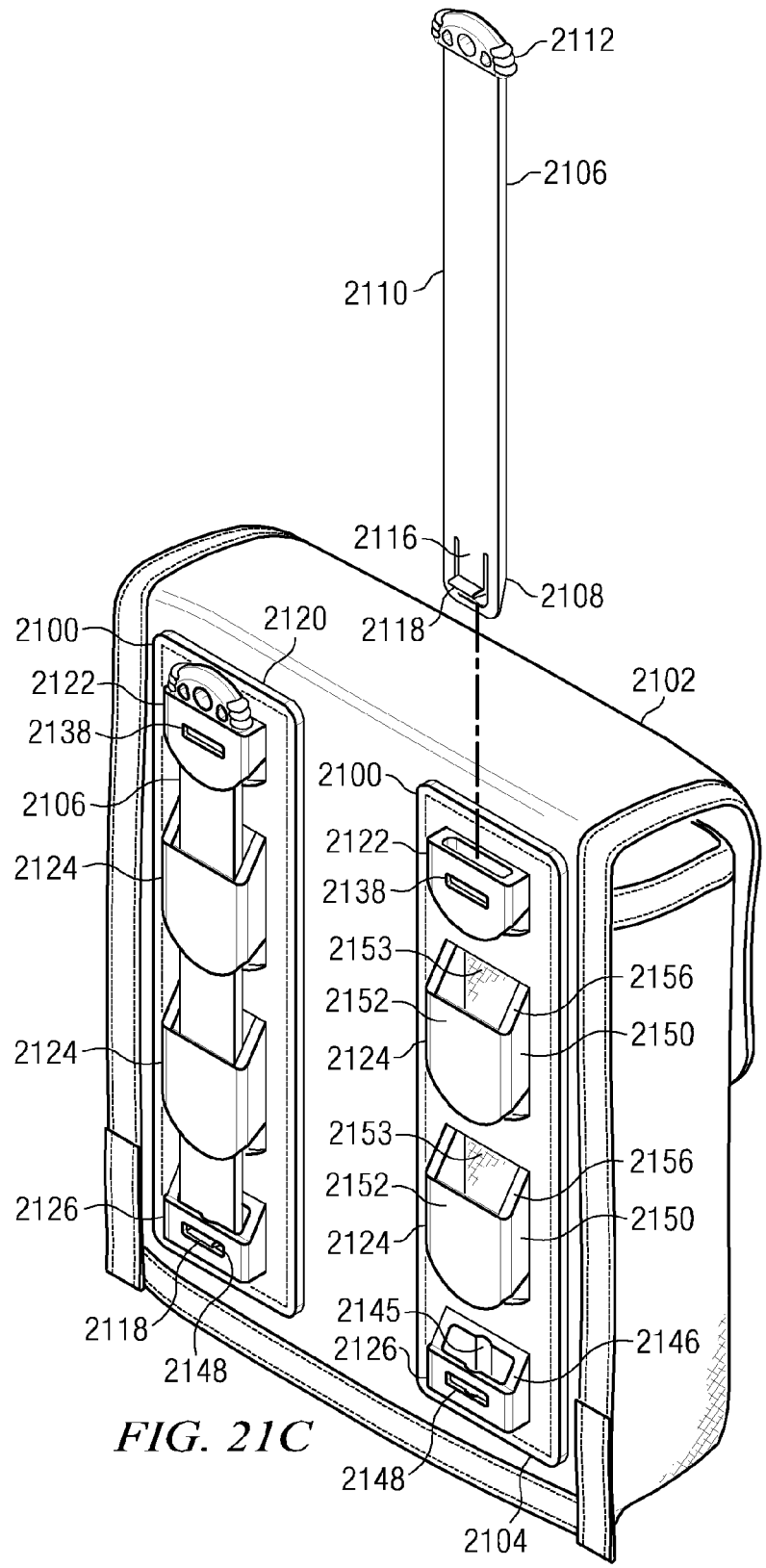
FIG. 21C is a perspective view of multiple attachment systems of FIG. 21A mounted on a single modular accessory.

Referring now to FIGS. 21A-21C, there is illustrated yet another embodiment of an adapter system or assembly for releasably securing accessory objects to substrates. The adapter assembly 2100 includes an adapter body 2104 and a locking member 2106. As disclosed herein, the adapter body 2104 of the system may be mounted on accessory objects to releasably secure them to webbing-type substrates, or alternatively, may be mounted on substrates to releasably secure webbing-type accessory objects to the substrate.

Referring first to FIG. 21A, the adapter assembly 2100 is shown used on an accessory object 2102 (in this case a modular pouch) to allow the accessory object to be releasably secured to a webbing-type substrate 2180. The adapter body 2104 is permanently affixed to the accessory object 2102 by sewing or as otherwise described herein. The substrate 2180 will typically be a wearable garment such as a vest, but may comprise any surface having suitable webbing strips 2182 attached thereto. The webbing strips 2182 are disposed in parallel on the substrate 2180 and attached by spaced-apart tack stitches 2184 or by other means including, but not limited to, rivets, adhesives and welding. The stitches 2184 (or attachment points, if applicable) on each webbing strip are aligned with those on adjacent webbing strips so as to form a series of raised (or raise-able) loops 2186 aligned on a common axis 2188 to form a loop column defining a common passageway through the loops (designated by dotted lines 2190). As will be further describe herein, the adapter body 2104 includes guides 2122, 2124 and 2126 that interfit with the loops 2186 on the substrate 2180. The locking member 2106 may be inserted, leading edge 2108 first, through the interfitted loops 2186 and guides 2122, 2124 and 2126 to secure the accessory object 2102 to the substrate 2180.

Referring next to FIG. 21B, the adapter assembly 2100 is shown used on a non-webbing-equipped substrate 2192 to allow a webbing-type accessory object 2194 (another modular pouch) to be releasably secured to the substrate. The adapter body 2104 is permanently affixed to the substrate 2192 by sewing or as otherwise described herein. The substrate 2194 may comprise a wearable garment, a belt, a pack or any surface on which the adapter body 2104 may be mounted. The accessory object 2194 has webbing strips 2182 attached thereto in a fashion similar to that of the substrate 2180 previously described, i.e., the webbing strips are disposed in parallel on the object and attached by spaced-apart tack stitches 2184 or by other means. The stitches 2184 or attachment points on each webbing strip 2182 are aligned with those on adjacent webbing strips so as to form a series of raised (or raise-able) loops 2186 aligned on a common axis 2188 to form a loop column defining a common passageway 2190 through the loops. The guides 2122, 2124 and 2126 of the adapter body 2104 interfit with loops 2186 of the accessory member 2194, and the locking member 2106 may be inserted through the interfitted loops and guides to secure the accessory object 2194 to the substrate 2192.

Referring next to FIG. 21C, two adapter assemblies 2100 are shown mounted on a single accessory object 2102 (in this case a double-wide modular pouch) to allow the accessory object to be releasably secured to a webbing-type substrate (not shown). Additional details of the adapter assemblies 2100 will now be disclosed, as shown in FIG. 21C and also in FIGS. 22A through 23F.

Figure 22A:
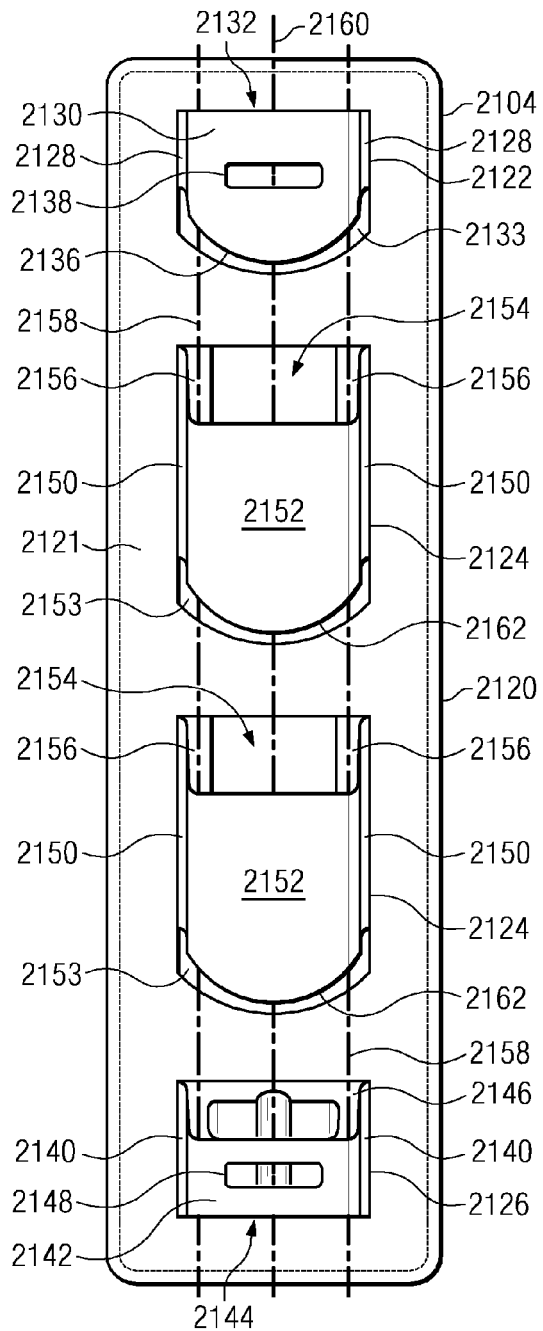
FIG. 22A is a top view of the adapter of FIG. 21A.
Figure 22B:
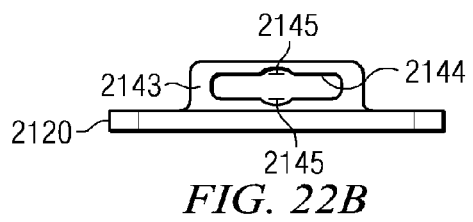
FIG. 22B is an end view of the adapter of FIG. 21A.

As best illustrated in FIGS. 21C and 22A-22B, adapter body 2104 includes a base 2120, a first end guide 2122, intermediate guides 2124 and a second end guide 2126. Guides 2122-2126 comprise raised areas (and are referred to as raised areas elsewhere herein) extending upwardly from base 2120. Adapter 2104 may advantageously be formed from a solid plastic material by molding, thermoforming or other appropriate fabrication techniques. Base 2120 may be secured to a substrate or accessory by sewing, gluing, riveting or by other suitable attachment means. Locking member 2106 may also be formed of a solid plastic material and made using the same techniques. Alternatively, locking member 2106 may be formed from a different material, such as a metal, and be fabricated using known methods.

Figure 22C:
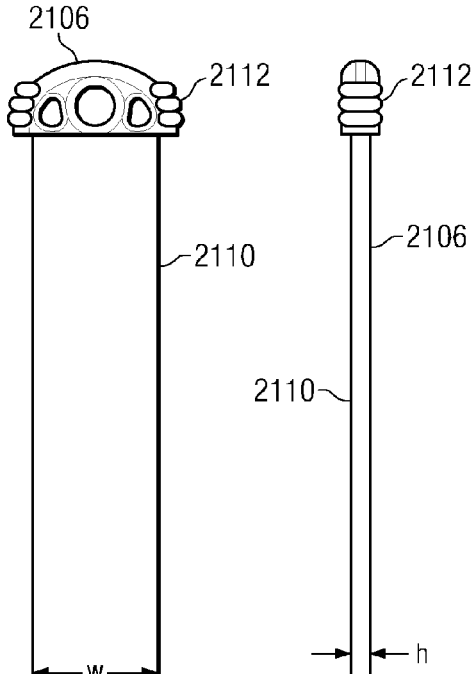
FIG. 22C is a top view of a locking member for use with the adapter of FIG. 21A.
Figure 22D:
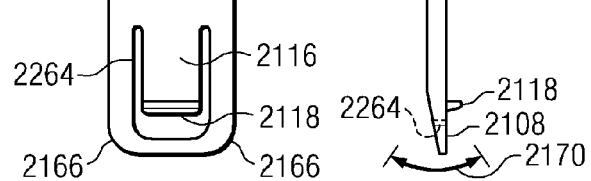
FIG. 22D is a side view of the locking member of FIG. 22C.

As best illustrated in FIGS. 22C and 22D, locking member 2106 includes a leading end 2108, a main body 2110 and a trailing end 2112. In one embodiment, locking member 2106 is generally blade-shaped with the main body 2110 of the locking member having a width (denoted "W" in FIG. 22C) substantially greater than the height (denoted "H" in FIG. 22D) of the main body. A first component of a latching mechanism for securing locking member 2106 in adapter is formed proximate the leading end of the locking member. In the illustrated embodiment, the first component comprises a resilient lip 2116 having a wedge 2118 extending from the lip generally perpendicular to main body 2110 of locking member 2106.

Referring to FIGS. 22A, 22B and 23A-23C, first end guide 2122 is formed proximate a first end of base 2120 and includes parallel opposed sidewalls 2128 extending substantially perpendicular to the base and a top wall 2130 extending between the sidewalls. Sidewalls 2128 and top wall 2130 define a slot 2132 extending through the guide. The area of base 2120 beneath slot 2132 is open, forming a hole 2133 between sidewalls 2128. Sidewalls 2128 each have a slanted end 2134 (FIG. 23B) that is angled toward second end guide 2126. In one embodiment, top wall 2130 includes an arcuate lip 2136 that extends toward second end guide 2126 parallel to the top wall beyond slanted end 2134 of sidewalls 2128. Although as illustrated, lip 2136 is arcuate, in other variations, the lip could be square, triangular or other be configured with a different geometry.

In the illustrated embodiment, slot 2132 has a width substantially greater than the height of the slot and is configured to receive locking member 2106 such that the locking member and adapter 2104 cannot be rotated relative to each other along the longitudinal axis of the locking member. In one embodiment, a second component of the latching mechanism comprises a slot or aperture 2138 extending through top wall 2130 and opening into slot 2132. Slot 2140 can receive wedge 2118 of locking member 2106 to releasably secure the locking member in first end guide 2122.

Referring still to FIGS. 21C and 22A-22C, second end guide 2126 is formed proximate a second end of base 2120 and includes parallel opposed sidewalls 2140 extending substantially perpendicular to the base, a top wall 2142 extending between the sidewalls and a bottom wall 2143 extending between sidewalls 2140. As best shown in FIG. 22B, a groove 2145 formed in each of top and bottom walls 2142, 2143 extends parallel to longitudinal axis 2160 of adapter 2104. Sidewalls 2140, top wall 2142 and bottom wall 2143 define a slot 2144 extending through the guide. Sidewalls 2140 each have a slanted end 2146 (FIG. 23B) that is angled away from first end guide 2122. Slot 2144 has a width substantially greater than the height of the slot and is configured to receive locking member 2106 such that the locking member and adapter 2104 cannot be rotated in the slot. In one embodiment, a second component of the latching mechanism comprises a slot or aperture 2148 extending through top wall 2142 and opening into slot 2144. Slot 2148 receives wedge 2118 of locking member 2106 to releasably secure the locking member in second end guide 2126.

Referring still to FIGS. 21C and 22A-22C, two spaced apart intermediate guides 2124 each extend from upper surface 2121 of base 2120 at spaced apart locations along the base. In alternate embodiments adapter 2104 may include a single intermediate guide 2124 or a plurality of intermediate guides, for example three, four, five or more intermediate guides positioned between end guides 2122, 2126. Guides 2122-2124 are spaced apart to receive webbing straps (e.g., strips 2182 of FIGS. 21A and 21B) or guides of a corresponding adapter (e.g., FIGS. 24A and 24B) between the guides.

Each of intermediate guides 2124 has parallel opposed sidewalls 2150 extending substantially perpendicular to base 2120 and a top wall 2152 extending between the sidewalls. Sidewalls 2150 and top wall 2152 define a slot 2154 extending through the guide. The area of base 2121 beneath guides 2124 is open, forming holes 2153 through the base below the guides. Sidewalls 2150 have slanted ends 2156 (FIG. 23B) that is angled toward second end guide 2126. As illustrated, slots 2154 have a width substantially greater than the height of the slot and are configured to receive locking member 2106 such that the locking member and adapter 2104 cannot be rotated relative to each other. An arcuate lip 2162 extends from, and parallel to, top wall 2152 toward second end guide 2126.

Referring to FIGS. 22A and 23A-23C, slots 2132, 2144 and 2154 of guides 2122-2126 define a common passageway or loop column 2158 (designated with dashed lines in FIGS. 22A and 23A) extending parallel to a longitudinal axis 2160 of adapter 2104. Passageway 2158 is configured to receive locking member 2106 to secure the adapter to a second, mating adapter 2200 (FIG. 25) or to a substrate or accessory having strips of webbing such as strips 104, 106 of FIGS. 1 and 2. In one embodiment, guides 2122-2126 are formed from a solid, substantially rigid plastic material such that slots 2132, 2144 and 2154 remain open during normal use. Similarly, in one embodiment, base 2120 and locking member 2106 are formed from a solid plastic material such that the base and locking member are substantially rigid, yet flexible enough to bend or flex a minor amount to facilitate insertion of the locking member through slots 2132, 2134 and 2154 as indicated by arrows 2170 and 2172 in FIGS. 22D and 23B. In one variation, Guides 2122-2126 are integrally formed from the same solid plastic material by blow molding, injection molding, thermoforming or other known plastic fabrication techniques.

Turning to FIGS. 23D and 23E, in one embodiment guides 2122, 2124 and 2126 are dimensioned and positioned on base 2120 so that strips of webbing 2182 may be received between the intermediate guides 2124 and between the intermediate guides and the end guides 2122, 2126. As best illustrated in FIGS. 21A and 21B, webbing strips 2182 are attached to a substrate 2180 or accessory 2194 with a series of tack stitches 2184 that run perpendicular to the webbing to a series of loops 2186 aligned on a common axis 2188 to form a loop column defining a common passageway 2190 (designated with dotted lines) through the loops. Turning to FIGS. 23D and 23E, when used to secure an accessory object to substrate having webbing strips, lip 2136 of first end guide 2122 and lips 2162 of intermediate guides 2124 hook over the strips 2182, facilitating alignment of the guides and the strips for interconnection with locking member 2106. Insertion of locking member 2106 over webbing strips 2182 traps the strips between the locking member and base 2120, securing adapter 2104 to a substrate 2180 or an accessory 2194 that is provided with webbing strips 2182. When locking member 2106 is fully inserted through guides 2122, 2124 and 2126, wedge 2118 of the locking member enters slot 2148, securing the locking member in position.

Referring to FIG. 23F, groove 2145 enables a user to use a pointed object such as a ballpoint pen or the tip of a pointed bullet to aid in releasing wedge 2118 from slot 2148 when the user desires to remove locking member 2106 from adapter 2104. The user inserts the pointed end of for example, a ballpoint pen or a bullet between the leading end 2108 of locking member 2106 and the inside surface of top wall 2142 of second end guide 2126, forcing the tip of the locking member downward, away from the top wall. This, in turn, tends to disengage, or decrease the length of wedge 2118 in slot 2148, allowing the user to pull locking member 2106 from second end guide 2126 with less force than would otherwise be required. The user may then retract locking member 2106 until wedge 118 engages slot 2128 in first end guide 2122. With wedge 2118 engaged in slot 2128, the user may then release the locking member that will remain secured to adapter 2104 while the user removes the adapter from an accessory object or substrate and/or reconnects the adapter to a different accessory or substrate.

As best shown in FIGS. 24 and 25 in another embodiment, a mating adapter 2200 is provided for use with adapter 2104. The mating adapter 2200 includes a base 2202 with a plurality of mating guides 2204 extending from the base. As shown in FIG. 25, mating adapter 2200 is attached to an accessory, pouch 2201, with adapter 2204 affixed to a substrate such as a wearable garment 2203. However, the locations of adapter 2104 and mating adapter 2200 could be reversed, with adapter 2104 affixed to pouch 2201 with mating adapter 2200 sewn or otherwise secured to garment 2203.

Mating guides 2204 are substantially similar to intermediate guides 2124 of adapter 2104 with each mating guide including opposed parallel sidewalls 2210 extending substantially perpendicular to base 2202 and having slanted ends 2212. A top wall 2214 extends between sidewalls 2210 to define a slot 2216 extending through each mating guide 2204. In the illustrated embodiment, slots 2216 each have a width greater than the height of the slot. In one variation, mating guides 2204 each include an arcuate lip 2218 extending from top wall 2214 in the direction of slanted ends 2212. Slots 2216 are aligned along a common axis extending parallel to the longitudinal axis 2222 of mating adapter 2200 to form a common passageway or loop column 2220 configured to receive locking member 2106. In one embodiment, mating guides 2204 are formed from a substantially rigid plastic material such that slots 2216 remain open during normal use. Similarly, base 2202 may be formed from a solid plastic material such that the base is substantially rigid, yet flexible enough to bend a minor amount. Mating guides 2204 are dimensioned and spaced apart so as to interfit between guides 2122-2128 of adapter 2104. In one embodiment, base 2202 and guides 2204 are integrally formed from a solid plastic material by injection molding, blow molding, thermoforming or other known plastic fabrication technique.

Referring to FIGS. 24, 25, 26A and 26B, mating adapter 2200 is positioned with mating guides 2204 aligned between guides 2122-1226 of adapter 2104. In one embodiment, mating adapter 2200 and/or adapter 2104 are moved laterally (perpendicular to longitudinal axes 2160, 2222) relative to each other such that mating guides 2204 slide into the spaces between guides 2122-2226 of adapter 2104. As best shown in FIG. 26A, when mating guides 2204 are moved into alignment with guides 2122-2124 of adapter 2104, the lips 2136, 2162 of guides 2122-2124 overlap the lips 2218 of guides 2204 of the mating adapter. With adapter 2104 and mating adapter 2200 aligned in this manner, passageway 2158 is aligned with passage 2220 for insertion of the locking member through the passageways.

With passageways 2158 and 2220 in operational alignment, the user pushes locking member 2106 through first end guide 2122 in a direction parallel to longitudinal axis 2160 and then through guides 2126, 2204 and into end guide 2126. As best shown in FIGS. 22C and 22D, the leading end 2108 of locking member 2106 is formed with a beveled surface 2164 and rounded corners 2166 to aid the user in inserting the locking member through guides 2122-2126 and 2204.

Referring to FIGS. 22C-22D, a U-shaped slot 2264 formed in locking member 2106 separates lip 2116 from main body 2110 of the locking member on three sides, allowing lip 2116 to flex relative to the main body. When locking member 2106 is inserted into first end guide 2122, lip 2116 flexes down as wedge 2118 contacts the inner surface of the upper walls 2130, allowing the locking member to move into the guide. When wedge 2118 moves into alignment with slot 2138, lip 2116 forces the wedge into the slot, holding the locking member in place.

Figure 23A:
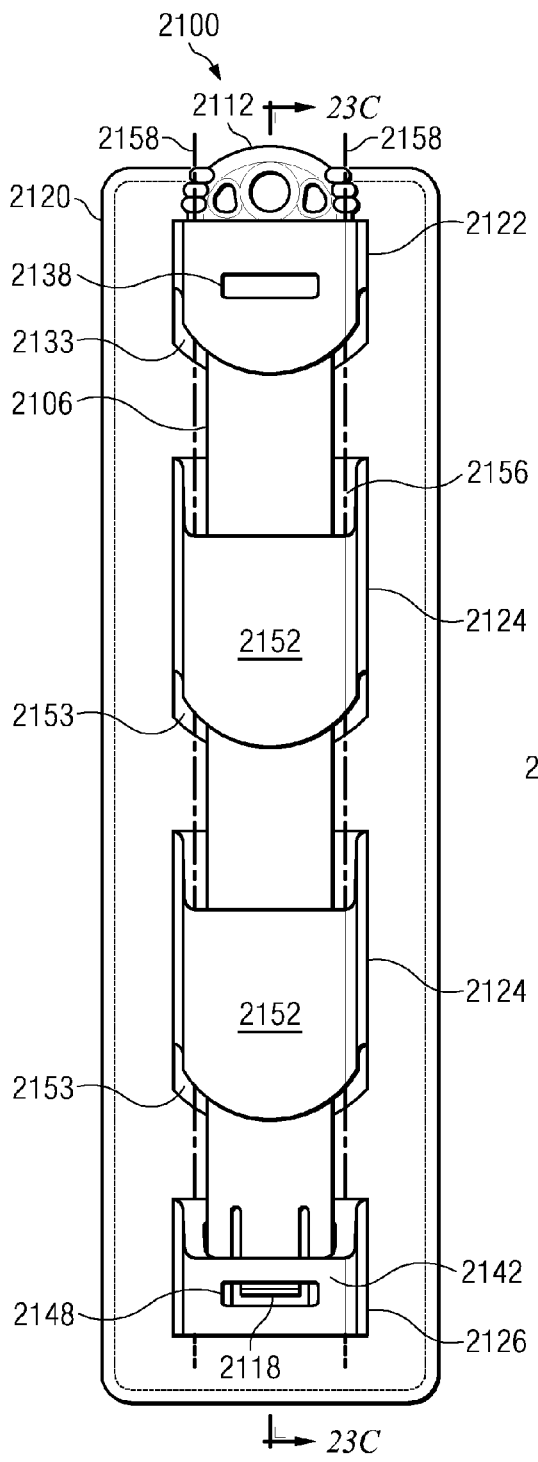
FIG. 23A is a top view of the adapter of FIG. 21A with the locking member inserted.
Figure 23B:
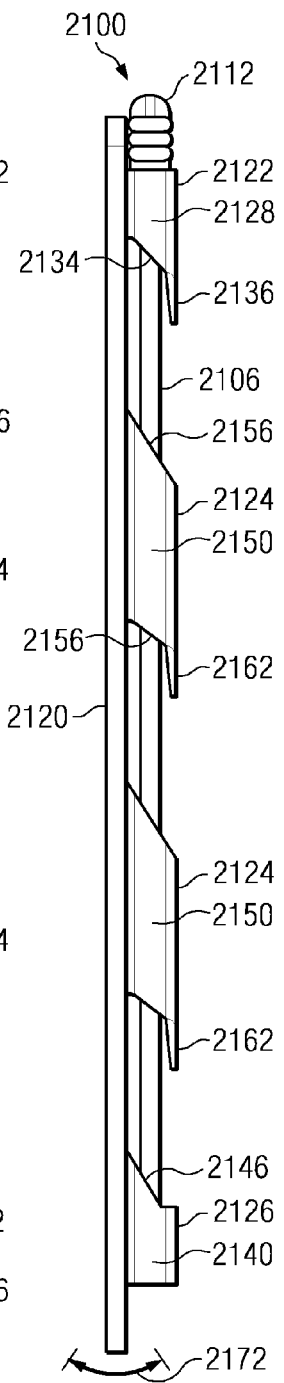
FIG. 23B is a side view of the adapter and locking member of FIG. 23A.
Figure 23C:
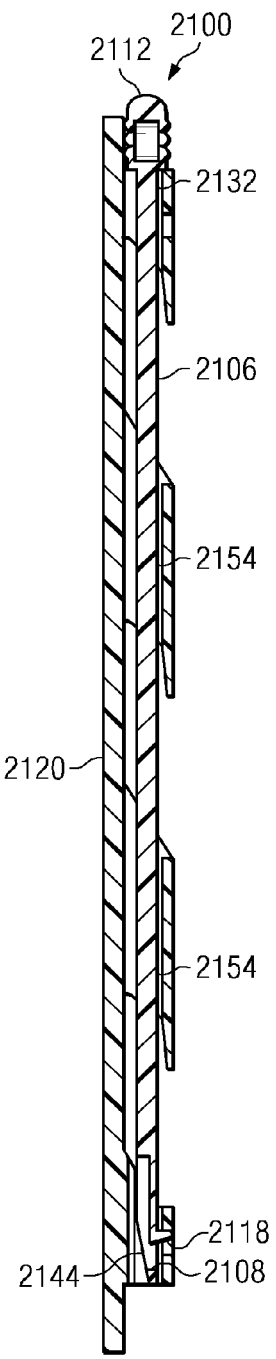
FIG. 23C is a sectional view of the adapter and locking member of FIG. 23A taken along line 23C-23C of FIG. 23A.

Referring to FIGS. 22D and 23C, when the leading end 2108 of locking member 2106 moves into second end guide 2126, wedge 2118 becomes aligned with slot 2148. Lip 2116 flexes to force wedge 2118 into slot 2148, securing locking member 2106 in position. In order to prevent locking member 2106 from passing completely through first end guide 2122, trailing end 2112 is enlarged with one or more dimensions larger than slot 2132 of the first end guide. In one embodiment, adapter 2104 and locking member 2106 are dimensioned so that enlarged end 2112 of the locking member contacts first end guide 2122 at the same time that wedge 2118 moves into engagement with slot 2148. In one variation, trailing end 2112 of locking member 2106 comprises an enlarged handle that may be ribbed, scored or otherwise designed to permit a user to securely grasp the locking member, even when wearing gloves. Locking member 2106 may also be provided with a cord or tether.

Turning now to FIGS. 27A-27F, in yet another embodiment, an adapter 2300 according to the disclosure includes a base 2302, first and second end guides 2304, 2308 and spaced apart intermediate guides 2306. In one embodiment, adapter 2300 is formed from a solid plastic material by molding, thermoforming or other appropriate fabrication techniques. Base 2302 may be secured to a substrate or accessory by sewing, gluing, riveting or by means of other suitable attachment means. A rib or stiffener 2313 extends along each of the longitudinal edges of base 2302 parallel to longitudinal axis 2320 of adapter 2300. As illustrated, stiffeners 2313 extend perpendicularly from base 2303 on the same side of the base as guides 2304-2308.

While as illustrated, adapter 2300 has two intermediate guides 2306, a greater or less number of intermediate guides may be provided. For example, adapter 2300 may have 1, 3, 4, 5 or more intermediate guides 2304 at spaced apart locations along the adapter. Each of intermediate guides 2306 comprises a top wall 2310 extending between opposed side walls 2312 each of which has inwardly sloping ends 2314 (FIG. 27C). The geometry of ends 2314 of intermediate guides 2206 creates one or more lateral openings 2316 (perpendicular to longitudinal axis 2320) that narrow from base 2302 toward top wall 2310 of the guides.

Referring to FIGS. 27A-27D, sidewalls 2312 and top walls 2310 of each of intermediate guides 2306 define a slot 2322 extending through the guides parallel to longitudinal axis 2320. In the illustrated embodiment, Base 2302 is open beneath top wall 2310 and between sidewalls 2312, defining a hole 2318 beneath each of intermediate guides 2306. Thus, slots 2322 have only three walls, sidewalls 2312 and top wall 2310. Each of slots 2322 has a width greater than the height of the slot and is configured to receive locking member 2106 through the slots. The configuration of slots 2322 is such that locking member 2106 cannot rotate around an axis parallel to longitudinal axis 2320 when inserted through the slots. In one embodiment, intermediate guides 2306 are integrally formed with base 2302 from a solid plastic material such that the guides are substantially rigid.

Figure 27A:
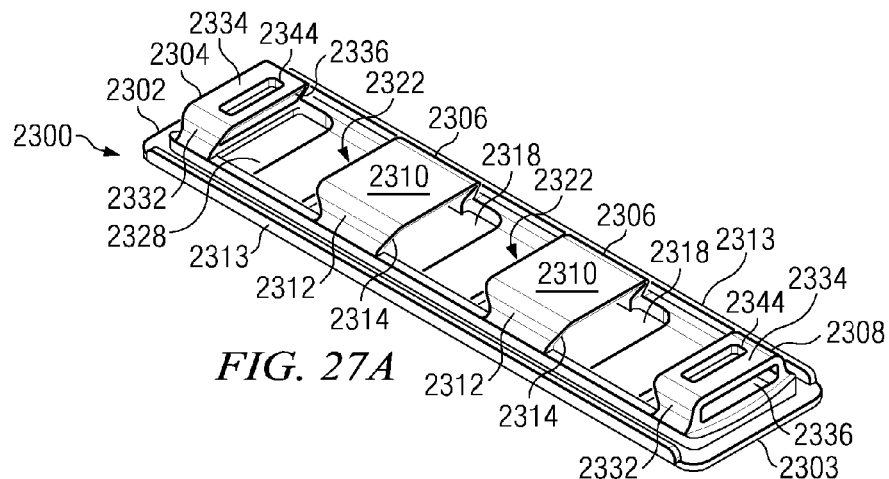
FIG. 27A is a perspective view of yet another adapter according to the disclosure.
Figure 27B:
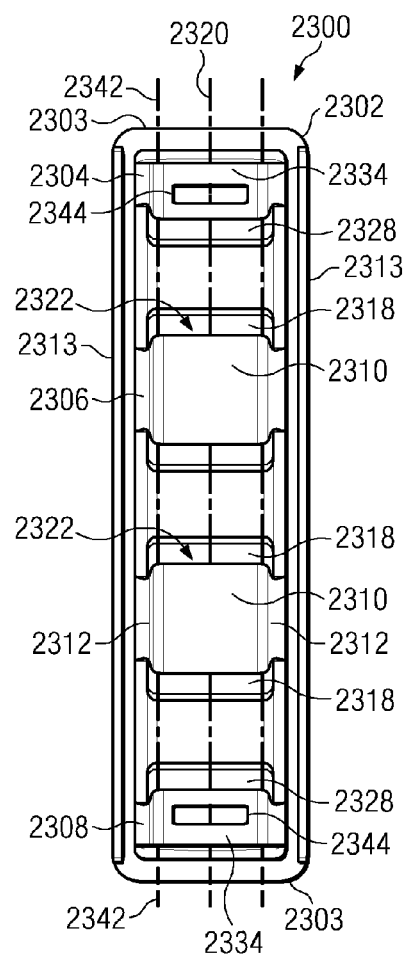
FIGS. 27B, 27C and 27D are top, side and bottom views of the adapter of FIG. 27A.
Figure 27C:
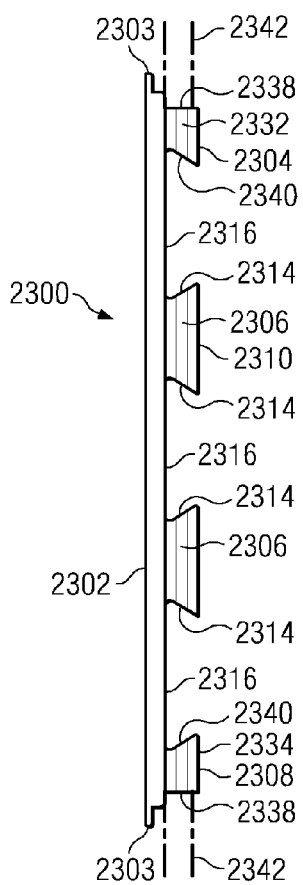
Figure 27D:
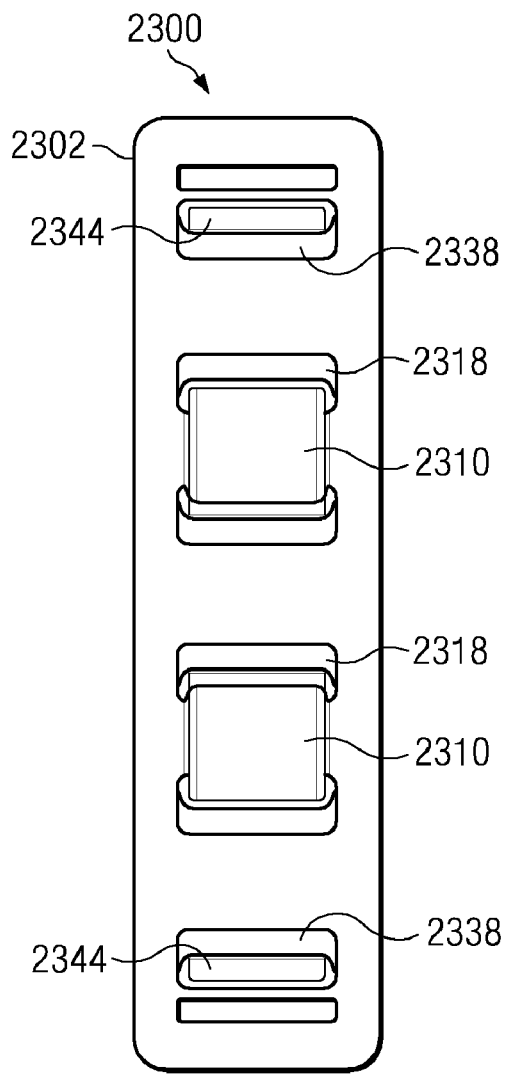
Figure 27E:
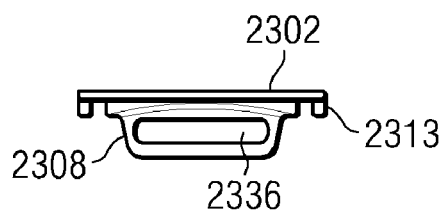
FIGS. 27E and 27F are bottom views of the adapter of FIG. 27A.
Figure 27F:
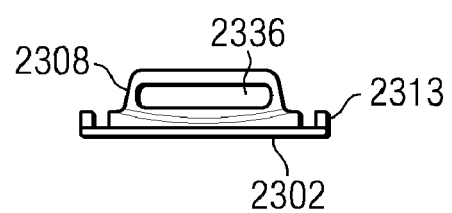

As best illustrated in FIGS. 27A-27C, first and second end guides 2304, 2308 are positioned adjacent ends 2303 of base 2302. Each of end guides 2330 includes a pair of parallel side walls 2332 and a top wall 2334 extending between the sidewalls such that the sidewalls and top wall define slots 2336 extending though the guides parallel to longitudinal axis 2320. Each of slots 2336 has a width greater than the height of the slot and is configured to receive locking member 2106 therethrough. In one embodiment, holes 2328 extend through the base partially beneath top walls 2334 such that the base is open below a portion of end guides 2304, 2308.

Sidewalls 2332 each have a substantially perpendicular end 2338 adjacent ends 2303 of base 2302 and slanted ends 2340 that slope toward intermediate guides 2306 from base 2302 to top wall 2334. Slanted ends 2340 of end guides 2304, 2308 along with slanted ends 2314 of intermediate guides 2306 define lateral openings 2316 (perpendicular to longitudinal axis 2320) between the end guides and adjacent intermediate guides 2306 that narrow from base 2302 toward top walls 2310, 2334 of intermediate and end guides 2306, 2308, respectively.

Referring still to FIGS. 27A-27F, slots 2322 and 2336 are aligned parallel to longitudinal axis 2320 to form a common passageway or loop column 2342 (designated with dashed lines in FIG. 27B) adapted to receive locking member 2106. In one embodiment, each of end guides 2304, 2308 has a slot 2344 formed through top wall 2334 perpendicular to longitudinal axis 2320 for receiving wedge 2118 of locking member 2106 to secure the locking member in guides 2304-2308. Providing a slot in each of end guides 2304, 2308 allows locking member 2106 to be inserted from either end of adapter 2300 and further, provides a means of holding the locking member with only the leading end of the locking member positioned in one of end guides 2304, 2308. This feature permits the user to release locking member 2106 while aligning adapter 2300 with a second adapter or with loops 2186 of webbing 2182 (FIG. 22A). In this regard, openings 2316 between guides 2304-2308 are spaced apart and dimensioned to receive strips 2182 such that adapter 2300 may be used to secure an accessory or substrate to a second accessory or substrate provided with webbing strips 2182.

Turning now to FIGS. 28A-28E, and in particular 28B and 28D, guides 2304-2308 are configured such that a first adapter 2300 may be operationally aligned with a second adapter 2300' by inserting intermediate guides 2306 and second end guide 2308 into openings 2316' and the corresponding guides 2306' and second end guide 2308' in openings 2316. One or more of sloped ends 2314 and 2314' of guides 2304-2308 and 2304'-2308' may be abutted to aid in aligning slots 2322, 2336 and 2322', 2336.' and common passageways 2342, 2342'. Locking member 2106 is then inserted through the guides 2304-2308 and 2304'-2306' to secure first adapter 2300 to second adapter 2300' with wedge 2118 engaging slot 2344' as illustrated in FIG. 28A. In this manner, an adapter 2300 affixed to a substrate or accessory object may be mated with an identical adapter 2300' affixed to the other of the substrate or accessory object to secure the accessory object to the substrate.

The drawings and detailed description herein are to be regarded in an illustrative rather than a restrictive manner, and are not intended to limit the following claims to the particular forms and examples disclosed. On the contrary, further modifications, changes, rearrangements, substitutions, alternatives, design choices, and embodiments will be apparent to those of ordinary skill in the art. Thus, it is intended that the following claims be interpreted to embrace all such further modifications, changes, rearrangements, substitutions, alternatives, design choices, and embodiments

What is claimed is:

1. An adapter for removably securing one of an accessory object or substrate object to another of an accessory object or substrate object, one of the substrate object or accessory object having a plurality of loops disposed at spaced apart locations along a column axis on a top side thereof, the loops forming at least one loop column, the adapter comprising:
   an elongate locking member having a main body, a leading end, a trailing end and a first latching feature;
   an adapter body formed from a solid plastic material including a base affixable to one of the accessory object or substrate object;
   a first end guide extending from the base proximate a first end of the adapter body, the first guide defining a slot therethrough for receiving the locking member;
   a second end guide extending from the base proximate a second end of the adapter body, the second guide defining a slot therethough, at least one of the first and second end guides including a second latching feature for engaging the first latching feature of the locking member;
   at least one intermediate guide extending from the base, the intermediate guide spaced apart from and disposed between the first and second end guides, the slots of the end and intermediate guides defining a common passageway through the guides for receiving the locking member; and
   wherein the leading end of the locking member is received through a first one of the end guides, a first one of the loops of the loop column, at least one intermediate guide, at least one second one of the loops of the loop column and the second one of the end guides to secure the adapter to one of the accessory object and substrate object with the first latching feature engaging one second latching feature to secure the locking member in the passageway.

2. The adapter of claim 1 wherein the substrate object comprises a wearable garment and wherein the adapter body is affixed to one of the wearable garment and accessory object by sewing the base to the one of the wearable garment and accessory object.

3. The adapter of claim 1 wherein at least one of the first end guide and the second end guide has a top wall and a bottom wall that includes a groove formed on an inside surface thereof that, when the first latching feature is engaged with the second latching feature, facilitates insertion of a pointed object between the locking member and the inside surface of the respective end guide to disengage the first and second latching features.

4. The adapter of claim 1 wherein the locking member further comprises an enlarged trailing end such that the trailing end cannot enter the slot defined by the first end guide.

5. The adapter of claim 1 wherein the locking member further comprises an enlarged trailing end such that the trailing end cannot enter the slot defined by the second end guide.

6. The adapter of claim 1 wherein each intermediate guide comprises opposed sidewalls, a top wall extending between the side walls and a lip extending from the top wall in a direction parallel to the common passageway.

7. The adapter of claim 1 wherein at least one of the end guides comprises opposed side walls, a top wall extending between the side walls and a lip extending from the top wall in a direction parallel to the common passageway.

8. The adapter of claim 1 wherein the first latching feature comprises a wedge-shaped projection.

9. The adapter of claim 1 wherein the second latching feature comprises an aperture or hole for receiving the first latching member.

10. An adapter for removably securing one of an accessory object or substrate object to another of an accessory object or substrate object using an elongate locking member having a main body, a leading end, a trailing end, a first latching feature and a configuration with a width greater than height, one of the substrate object or accessory object having a plurality of loops disposed at spaced apart locations along a column axis on a top side thereof, the loops forming at least one loop column, the adapter comprising:
   an adapter body formed from a solid material including a base affixable to one of the accessory object or substrate object;
   a first, substantially rigid end guide extending from the base proximate a first end of the adapter body, the first guide defining a slot having a width greater than height and including a second latching feature for engaging the first latching feature of the locking member;
   a second, substantially rigid end guide extending from the base proximate a second end of the adapter body, the second guide defining a slot having a width greater than height and including a second latching feature for engaging the first latching feature of the locking member;
   at least one, substantially rigid intermediate guide extending from the base and spaced apart from and disposed between the first and second end guides, each intermediate guide defining a slot having a width greater than height, the slots of the end and intermediate guides defining a common axis therethrough and defining a passageway through the guides for receiving the locking member; and
   wherein the main body of the locking member is received through at least one of the loops of the loop column and at least two of the slots to secure the adapter to one of the substrate object or accessory object with the first latching feature engaging one second latching feature to secure the locking member in the passageway such that the adapter is non-rotatatable around the locking member when the locking member is received in the slots.

11. The adapter of claim 10 wherein the substrate object comprises a wearable garment and wherein the adapter body is affixed to one of the wearable garment and accessory object by sewing the base to the one of the wearable garment and accessory object.

12. The adapter of claim 10 wherein the adapter is formed from a solid plastic material and wherein the second end guide has a top wall and a bottom wall and wherein at least one of the top and bottom walls includes a groove formed on an inside surface thereof that, when the first latching feature is engaged with the second latching feature, facilitates insertion of a pointed object between the locking member and the inside surface of the second end guide to disengage the first and second latching features.

13. The adapter of claim 10 wherein the slots defined by the first and second end guides are sized such that the trailing end of the locking member cannot enter the slots.

14. The adapter of claim 10 wherein each intermediate guide comprises opposed sidewalls, a top wall extending between the side walls and a lip extending from the top wall in a direction parallel to the common axis and wherein at least one of the end guides comprises opposed side walls, a top wall extending between the side walls and a lip extending from the top wall in a direction parallel to the common axis.

15. The adapter of claim 10 wherein the base is open under the intermediate guides.

16. The adapter of claim 10 wherein the second latching feature comprises an aperture for receiving the first latching feature.

17. An adapter for removably securing an accessory object to a wearable garment, the wearable garment having a plurality of loops disposed at spaced apart locations along a column axis on a top side thereof, the loops forming at least one loop column for receiving the main body of an elongate locking member having a first latching feature therethrough, the adapter comprising:

an adapter body formed from a solid plastic material including a base affixable to the accessory object;

a first substantially rigid end guide extending from the base proximate a first end of the adapter body, the first guide including a top wall and opposed side walls defining a slot parallel to a longitudinal axis of the adapter body;

a second, substantially rigid end guide extending from the base proximate a second end of the adapter body, the second end guide including a top wall and opposed sidewalls defining a slot parallel to a longitudinal axis of the adapter body, wherein at least one of the first and second end guides includes a second latching feature for engaging the first latching feature of the elongate locking member;

at least one intermediate guide extending from the base, the intermediate guide including a top wall and opposed sidewalls defining a slot parallel to a longitudinal axis of the adapter body, wherein the intermediate guide is spaced apart from and disposed between the first and second end guides for receiving the loops of the loop column between the intermediate and end guides, the slots having a common axis therethrough and defining a passageway through the guides for receiving the locking member; and wherein the locking member is inserted through at least one of the loops of the loop column and at least two of the slots to secure the accessory object to the wearable garment with the first latching feature engaging one second latching feature to secure the locking member in the passageway.

18. The adapter of claim 17 wherein the adapter is affixed to the accessory object by sewing.

19. The adapter of claim 17 further comprising an elongate locking member formed from a solid plastic material, the locking member having a leading end, a main body an enlarged trailing end having at least one dimension larger than the slots of the end guides such that the trailing end cannot enter the slots of the end guides.

20. The adapter of claim 17 wherein at least one of the first and second end guides has a top wall and a bottom wall which includes a groove formed on an inside surface thereof that, when the first latching feature is engaged with the second latching feature, facilitates insertion of a pointed object between the locking member and the inside surface of the respective end guide to disengage the first and second latching features.

* * * * *